US012632547B2

(12) United States Patent
Ogawa

(10) Patent No.: US 12,632,547 B2
(45) Date of Patent: May 19, 2026

(54) INFORMATION PROCESSING APPARATUS AND VIRUS DETECTION DISPLAY METHOD

(71) Applicant: SHARP KABUSHIKI KAISHA, Sakai City (JP)

(72) Inventor: Akira Ogawa, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 162 days.

(21) Appl. No.: 18/384,017

(22) Filed: Oct. 26, 2023

(65) Prior Publication Data

US 2024/0143756 A1     May 2, 2024

(30) Foreign Application Priority Data

Nov. 2, 2022     (JP) ................................. 2022-176634

(51) Int. Cl.
*G06F 21/56*          (2013.01)

(52) U.S. Cl.
CPC ...... *G06F 21/561* (2013.01); *G06F 2221/034* (2013.01)

(58) Field of Classification Search
CPC .......................... G06F 21/561; G06F 2221/034
USPC .......................................................... 726/24
See application file for complete search history.

(56) References Cited

U.S. PATENT DOCUMENTS

| | | | |
|---|---|---|---|
| 6,401,210 B1 * | 6/2002 | Templeton .............. | G06F 21/56 |
| | | | 713/188 |
| 7,080,407 B1 * | 7/2006 | Zhao ...................... | G06F 21/554 |
| | | | 713/188 |
| 8,782,791 B2 * | 7/2014 | Sankruthi ........... | H04L 63/1491 |
| | | | 726/24 |
| 9,832,222 B2 * | 11/2017 | Hutton .................. | H04W 12/12 |
| 2003/0101381 A1 * | 5/2003 | Mateev ................. | G06F 21/566 |
| | | | 714/38.14 |
| 2003/0191957 A1 * | 10/2003 | Hypponen ............ | G06F 21/561 |
| | | | 726/24 |
| 2018/0121653 A1 * | 5/2018 | Akita ...................... | G06F 21/84 |
| 2023/0297677 A1 * | 9/2023 | Itoh ........................ | G06F 21/561 |
| | | | 726/24 |

FOREIGN PATENT DOCUMENTS

JP           2004-259060 A        9/2004

* cited by examiner

*Primary Examiner* — Michael S McNally
(74) *Attorney, Agent, or Firm* — ScienBiziP, P.C.

(57) ABSTRACT

An information processing apparatus including: one or more controllers that detect a virus and perform a specific measure on a file infected with the virus; and a display that displays that the virus has been detected as display content based on control performed by the one or more controllers, in which the one or more controllers control display indicating that the virus has been detected in a case where the file from which the virus has been cleaned as a result of the specific measure corresponds to the file as a target of the display indicating that the virus has been detected.

15 Claims, 21 Drawing Sheets

| FILE ID | FILE NAME | DATA TYPE | FILE PATH | VIRUS TYPE | DETECTION DATE AND TIME | AUTOMATIC DELETION |
|---|---|---|---|---|---|---|
| #00010 | maliciousData.pdf | INPUT DATA | /media/usb/maliciousData.pdf | TROJ_KILLAV.CIA | 2021/10/13 9:30 | 0 |
| #04123 | maliciousData.so | SYSTEM DATA | /system/aaaaa/maliciousData.so | TROA_KILLAV.CIA | 2022/4/5 12:10 | 0 |
| #04133 | maliciousData2.so | SYSTEM DATA | /system/aaaaa/maliciousData2.so | TROA_KILLAV.CIA | 2022/5/15 9:50 | 0 |
| ... | ... | ... | ... | ... | ... | ... |

FIG. 3

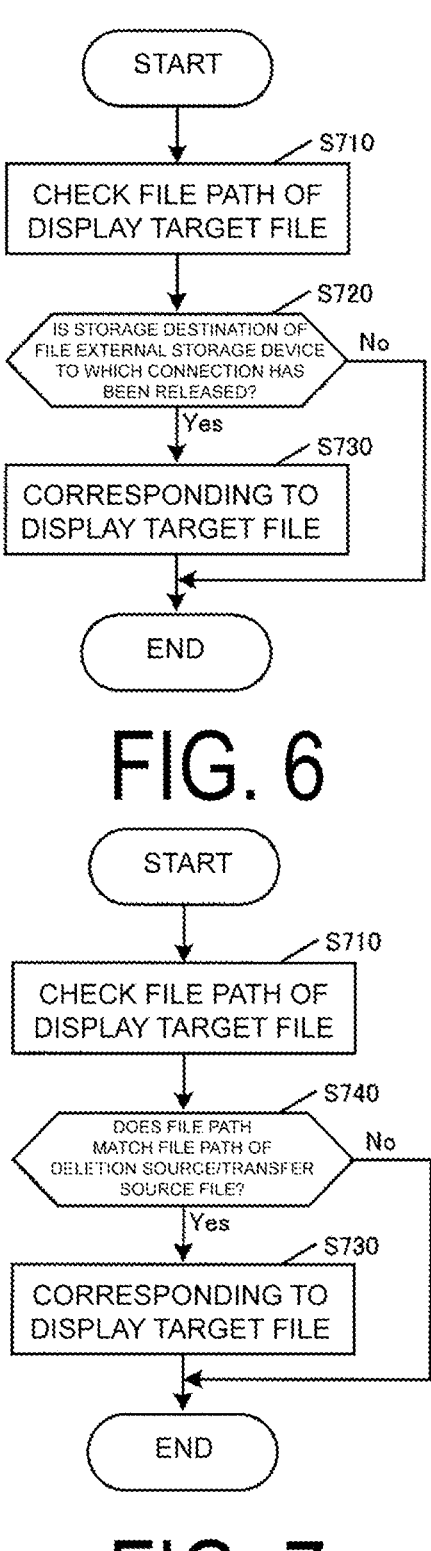

START

CHECK FILE PATH OF
DISPLAY TARGET FILE  ⟋S710

IS STORAGE DESTINATION OF
FILE EXTERNAL STORAGE DEVICE
TO WHICH CONNECTION HAS
BEEN RELEASED?  ⟋S720

No

Yes

CORRESPONDING TO
DISPLAY TARGET FILE  ⟋S730

END

FIG. 6

START

CHECK FILE PATH OF
DISPLAY TARGET FILE  ⟋S710

DOES FILE PATH
MATCH FILE PATH OF
DELETION SOURCE/TRANSFER
SOURCE FILE?  ⟋S740

No

Yes

CORRESPONDING TO
DISPLAY TARGET FILE  ⟋S730

END

FIG. 7

| FILE ID | CLEANING (DELETION) REASON | TARGET ITEM (BEFORE CLEANING) | TARGET ITEM (AFTER CLEANING) | CLEANING DATE AND TIME |
|---------|-----------------------------|-------------------------------|------------------------------|------------------------|
| #00010 | DISCONNECTION FROM EXTERNAL STORAGE DEVICE | maliciousData.pdf | — | 2021/10/13 10:30 |
| #04123 | DELETE INFECTED FILE | maliciousData.so | — | 2022/4/5 12:30 |
| #04133 | UPDATE INFECTED FILE | maliciousData2.so | maliciousData2a.so | 2022/5/17 10:30 |

FIG. 15

INFORMATION PROCESSING APPARATUS AND VIRUS DETECTION DISPLAY METHOD

TECHNICAL FIELD

The present disclosure relates to an information processing apparatus and the like.

BACKGROUND ART

Some information processing apparatuses are adapted to notify users of a fact that a virus has been detected when a virus is detected in an input job or data.

For example, a technology of deleting received data received via a network and notifying an apparatus administrator of the fact that a virus has been detected to encourage the apparatus administrator to handle the virus thereafter in a case where a virus is detected in the received data is known.

SUMMARY

Technical Problem

An object of the present disclosure is to provide an information processing apparatus and the like capable of providing a notification related to virus detection without leading to confusion of a user.

Solution to Problem

In order to solve the above problem, an information processing apparatus according to the present disclosure is an information processing apparatus including: one or more controllers that detect a virus and perform a specific measure on a file infected with the virus; and a display that displays that the virus has been detected as display content based on control performed by the one or more controllers, in which the one or more controllers control display indicating that the virus has been detected in a case where the file from which the virus has been cleaned as a result of the specific measure corresponds to the file as a target of the display indicating that the virus has been detected.

A virus detection display method according to the present disclosure includes: detecting a virus and performing a specific measure on a file infected with the virus; displaying that the virus has been detected as display content; and controlling display indicating that the virus has been detected in a case where the file as a target of the display indicating that the virus has been detected corresponds to the file from which the virus has been cleaned as a result of the specific measure.

Advantage Effects of Invention

According to the present disclosure, it is possible to provide an information processing apparatus and the like capable of providing a notification related to virus detection without leading to confusion of a user.

BRIEF DESCRIPTION OF DRAWINGS

FIG. 3 is a diagram for explaining a mode of a data structure of a file information table.

FIG. 6 is a flowchart for explaining a processing flow according to the first embodiment.

FIG. 7 is a flowchart for explaining a processing flow according to the first embodiment.

FIG. 15 is a diagram for explaining a mode of a data structure of an update information table.

DESCRIPTION OF EMBODIMENTS

Figure 1:
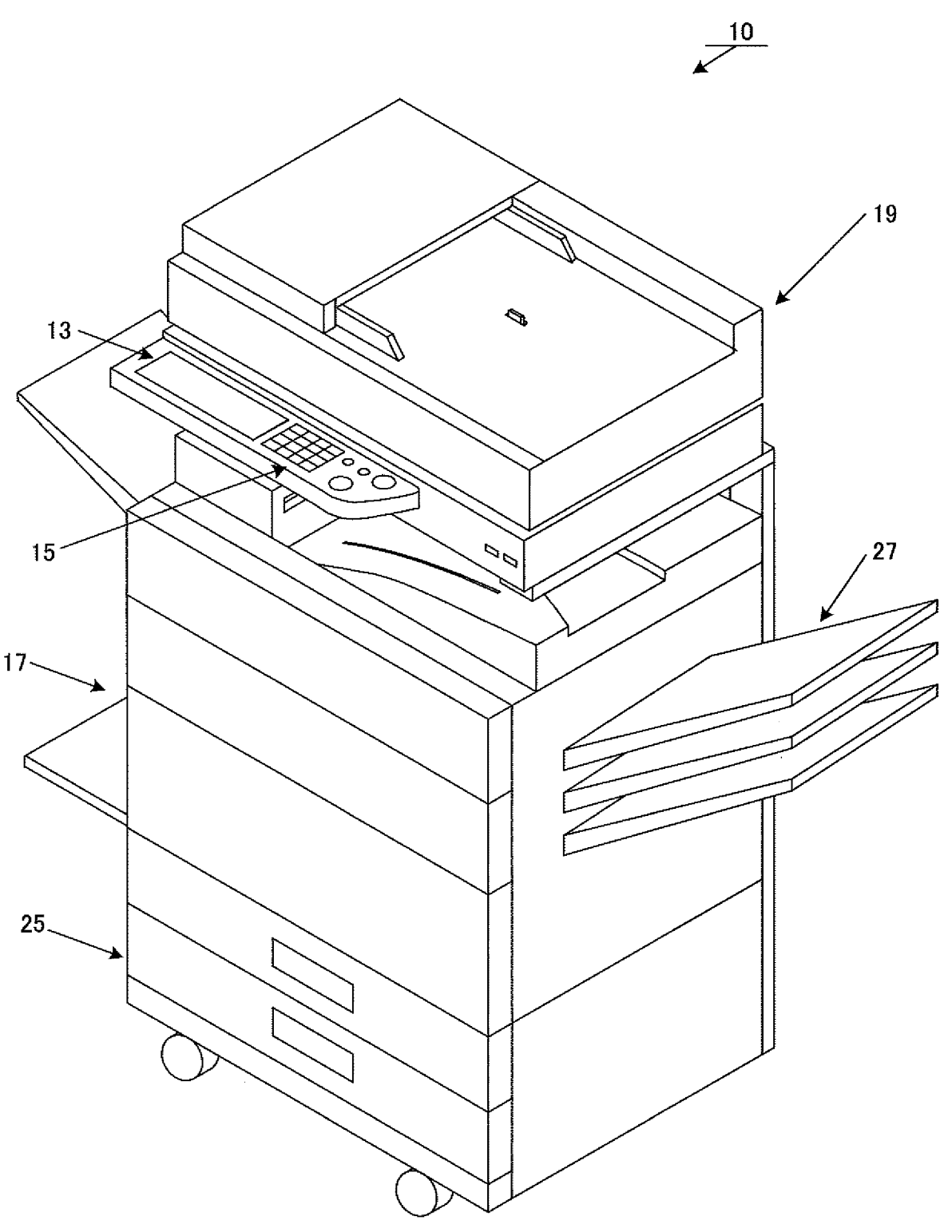
FIG. 1 is a diagram for explaining an overall configuration of a multifunction peripheral according to a first embodiment.

Embodiments according to the present disclosure will be described below with reference to the drawings. Note that the following embodiments are examples for describing the present disclosure, and the technical scope of the explanation described in the claims is not limited to the following description.

Some information processing apparatuses capable of reducing the risk of virus infection have a function of automatically deleting data files infected with a virus (hereinafter, referred to as infected files in some cases) and notifying a user of the fact that a virus has been detected. However, in a case where a virus is detected in types of files which may cause problems if they are automatically deleted without confirmation, approval of administrators, users and the like, such as system data files for updating firmware, data files stored in external storage devices such as universal serial bus (USB) memories connected to the information processing apparatuses, and the like, notifications indicating that viruses have been detected are provided without deletion of the target files.

The user who has checked the notifications takes measures such as manual deletion of the files or replacement of the files based on information regarding file paths, virus types, and the like described in the notifications.

Such notifications of virus detection may be displayed as a "notice" on a screen of choice displayed on an operation panel or the like of the information processing apparatus, and the "notice" display is continuously on the screen until the user perform a checking operation. Therefore, in a case where infected files in which a virus has been detected are data files stored in an external storage device connected to the information processing apparatus, and the external storage device is detached from the information processing apparatus before the user checks the "notice" display, the user who has received the notification cannot find the target data files and has difficulties in addressing the problems in some cases.

Control performed for providing a notification regarding virus detection without leading to confusion of a user in a case where a virus has been cleaned from an infected file as a result of a specific measure for realizing cleaning, deletion, isolation, or the like of the virus is realized in the following embodiments. The specific measure according to the present disclosure includes an operation/action (including both a user operation and an action achieved by a specific functional section such as one or more controllers), processing, command reception, and the like for realizing cleaning, deletion, or isolation of a virus, such as release of connection (mounting) to an external storage device or the like storing an infected file, deletion of the infected file, transfer of the infected file, or updating of the infected file.

1. First Embodiment

In a first embodiment, a multifunction peripheral (image formation apparatus) capable of carrying out jobs in various modes such as printing, copying, scanning, faxing, and Internet faxing in one casing will be described as a mode of the information processing apparatus. The multifunction peripheral according to the first embodiment is a multifunction peripheral including one or more controllers that detect a virus and perform a specific measure on a file infected with the virus and a display that displays the fact that the virus has been detected as display content based on control performed by the one or more controllers, in which the one or more controllers control the display indicating that the virus has been detected in a case where the file from which the virus has been cleaned as a result of the specific measure corresponds to the file as a target of the display indicating the virus has been detected. Particularly, a mode in which display indicating the virus has been detected is limited in a case where the file from which the virus has been cleaned as a result of the specific measure corresponds to the file as a target of the display indicating that the virus has been detected will be described in the first embodiment.

1.1 Functional Configuration

Figure 2:
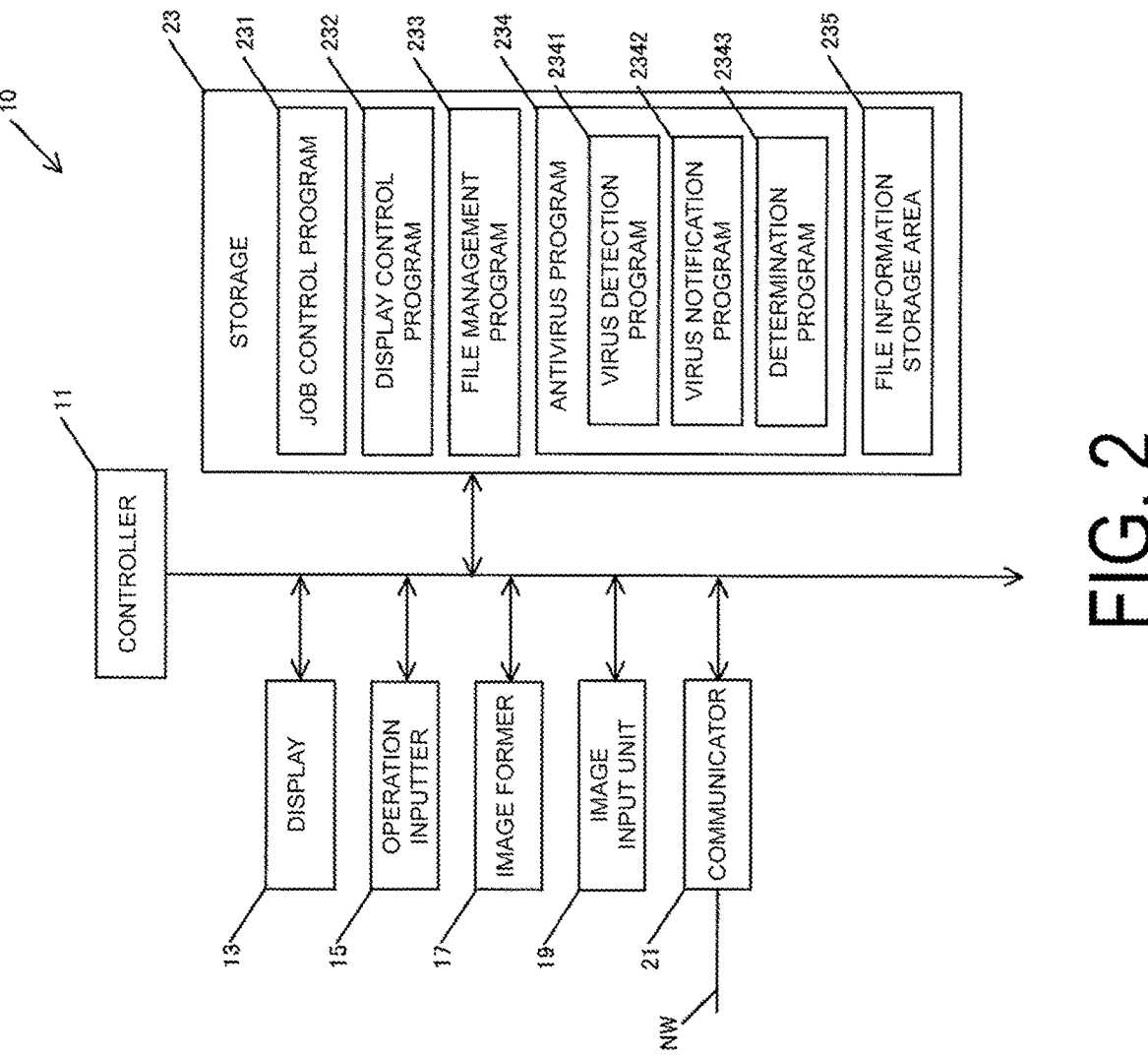
FIG. 2 is a diagram for explaining a functional configuration of the multifunction peripheral according to the first embodiment.

A functional configuration of a multifunction peripheral 10 according to the first embodiment will be described with reference to FIG. 1 and FIG. 2. FIG. 1 is an external perspective view for schematically explaining an overall configuration of the multifunction peripheral 10. FIG. 2 is a functional configuration diagram of the multifunction peripheral 10. The multifunction peripheral 10 includes a controller 11, a display 13, an operation inputter 15, an image former 17, an image inputter 19, a communicator 21, and a storage 23.

The controller 11 controls the entire multifunction peripheral 10. The controller 11 is configured of, for example, one or multiple arithmetic devices (central processing units (CPUs) or the like). The controller 11 realizes the function thereof by reading and executing various programs stored in the storage 23.

The display 13 displays various types of information for a user or the like. The display 13 can be configured of, for example, a liquid crystal display (LCD), an organic electroluminescence (EL) display, or the like. The display 13 can display that a virus has been detected or the like as display content based on control performed by the controller 11 reading a display control program 232, which will be described later.

The operation inputter 15 receives an input of information by a user or the like. The operation inputter 15 can be configured of hard keys (for example, a numeric keypad), buttons, and the like. The operation inputter 15 can be configured as a touch panel that allows inputs via the display 13. In this case, a general system such as a resistance film system, an infrared system, an electromagnetic induction system, or a capacitance system, for example, can be used as an input system of the touch panel.

The image former 17 forms an image based on image data input from the image inputter 19 on a sheet as a recording medium. The image former 17 feeds a sheet from a sheet feeder 25, forms an image based on image data on the sheet, and then discharges the sheet to a sheet discharger 27. The image former 17 can be configured of, for example, a laser printer using an electrophotographic system. In this case, the image former 17 performs image formation using a toner supplied from a toner cartridge, which is not illustrated, corresponding to toner colors (for example, cyan, magenta, yellow, and black).

The image inputter 19 can be configured as a scanner device including, for example, an image sensor such as a charge coupled device (CCD) or a charge image sensor (CIS), an automatic document feeder (ADF), a flatbed on which a document is placed to read the document, and the like. In this case, the configuration of the scanner device is not particularly limited as long as the scanner device can generate image data by reading a reflected light image from a document image with an image sensor with the configuration. The image inputter 19 may be configured as an interface capable of acquiring, for example, an image data file stored in an external storage device such as a USB memory, image data transmitted from an external device, which is not illustrated, via the communicator 21, and the like.

The communicator 21 includes, for example, one or both of wired and wireless interfaces for performing communication with other devices via a network NW such as a local area network (LAN), a wide area network (WAN), the Internet, a telephone line, or a fax line.

The storage 23 stores various programs and various types of data necessary for the operation of the multifunction peripheral 10. The storage 23 may, for example, be configured of a storage device such as a random access memory (RAM), a hard disk drive (HDD), a solid state drive (SSD), or a read only memory (ROM).

In the first embodiment, the storage 23 stores a job control program 231, a display control program 232, a file management program 233, and an antivirus program 234, and secures a file information storage area 235.

The job control program 231 is a program read by the controller 11 in order to perform processing related to the various modes such as printing, copying, scanning, faxing, and Internet faxing in units of jobs. The controller 11 that has read the job control program 231 executes jobs by controlling the display 13, the operation inputter 15, the image former 17, the image inputter 19, the communicator 21, and the like.

The display control program 232 is a program read by the controller 11 when display control of a display screen via the display 13 is performed. The controller 11 that has read the display control program 232 displays a home screen for receiving switching of a job mode or the like, a setting screen for receiving inputs of various setting values related to execution of a job according to a mode, and the like. The controller 11 performs display control for a notification (message) or the like indicating that a virus has been detected as display content.

The file management program 233 is a program that is read by the controller 11 when data to be managed by the multifunction peripheral 10, such as system data for firmware update, application data, device setting data, and input/output data related to execution of a job, for example, is managed in units of files. As a part of file management, the controller 11 that has read the file management program 233 can detect an operation/processing on the file, such as monitoring of a condition of connection (mounting) to the external storage device storing the file, deletion of the file, updating of the file, changing of a file name or a file path, or overwriting and saving of the file, for example.

The antivirus program 234 is a program that is read by the controller 11 in order to prevent virus infection of files as targets of management of the multifunction peripheral 10, prevent expansion of the virus infection, and the like. The antivirus program 234 includes a virus detection program 2341, a virus notification program 2342, and a determination program 2343.

The controller 11 that has read the virus detection program 2341 executes virus scanning for detecting a virus. In this case, the controller 11 can detect a virus by, for example, pattern matching with a virus definition file, which is not illustrated. In a case where a virus is detected, the controller 11 that has read the virus detection program 2341 associates information regarding the infected file with a file ID and stores the information in the file information storage area 235 as a file information table. The controller 11 that has read the virus detection program 2341 can receive settings such as a setting of a data (file) type to be subjected to virus scanning, a setting of an execution schedule of virus scanning, and an execution schedule of pattern update of a virus definition file via a setting screen, which will be described later, and register the contents of the settings.

The controller 11 that has read the virus notification program 2342 creates a virus detection message indicating that a virus has been detected as display content based on the file information table stored in the file information storage area 235. In a case where the virus detection message related to the infected file from which the virus has been cleaned as a result of a specific measure on the infected file is displayed, the controller 11 restricts the display of the virus detection message. The restriction of display according to the present disclosure refers to control for switching the virus detection message from a display state to a non-display state, and includes a mode in which the virus detection message is not created. Note that deletion, erasing, and transfer of the virus detection message from the display content that is being displayed on the display 13 are also included in the modes of the present disclosure, and the modes are not limited as long as control is performed to make visual checking of the virus detection message via the display 13 is not difficult or impossible.

The controller 11 that has read the determination program 2343 determines whether the operation or processing performed on the infected file corresponds to the specific measure. Specifically, in a case where the controller 11 detects an operation or processing such as disconnection from an external storage device or the like storing the infected file, deletion of the infected file, transfer of the infected file, or updating of the infected file (cleaning of a virus from an infected file) via the file management program 233, the controller 11 determines that the specific measure has been taken. The controller 11 that has read the determination program 2343 determines whether the virus detection message including the infected file from which the virus has been cleaned as a display target is being displayed in a case where the specific measure has been taken. In this case, the controller 11 determines whether the virus detection message related to the infected file is being displayed by checking the file path indicating the storage position of the display target file of the virus detection message.

The file information storage area 235 is a storage area for storing information regarding the infected file as a file information table. The file information table will now be described using FIG. 3.

FIG. 3 is a diagram for explaining a mode of a data structure of the file information table. The file information table includes a file ID, a file name, a data type, a file path, a virus type, a detection date and time, and an automatic deletion (flag) as storage items. The file ID is an identifier for uniquely identifying a file to be managed by the multifunction peripheral 10. The file name represents a file name of the infected file. The data type represents a data (file) type of the infected file. The file path indicates the storage position of the infected file. The virus type indicates the type of the detected virus. The detection date and time indicates the date and time when the virus has been detected. The automatic deletion is a flag indicating whether the data (file) type of the infected file is a data type that is a target of automatic deletion accompanying virus detection. In the example of FIG. 3, the flag value "1" is set for automatic deletion in a case of a data type as a target of automatic deletion accompanying virus detection. On the other hand, the flag value "0" is set for automatic deletion in a case where the data (file) type of the infected file is a data type that is not a target of automatic deletion.

For example, this represents that the infected file identified by the file ID "#00010" has the file name "maliciousData.pdf" and is data input to the multifunction peripheral 10 (data type: "input data"). This represents that the infected file is a data file stored in a USB memory connected to the multifunction peripheral 10 (file path: "media/usb") and is infected with a virus of the type "TROJ_KILLAV.CIA" and the virus has been detected at "2021/10/13 9:30". The infected file has a data type (flag value: 0) that is not a target of automatic deletion accompanying virus detection.

1.2 Processing Flow

Figure 4:
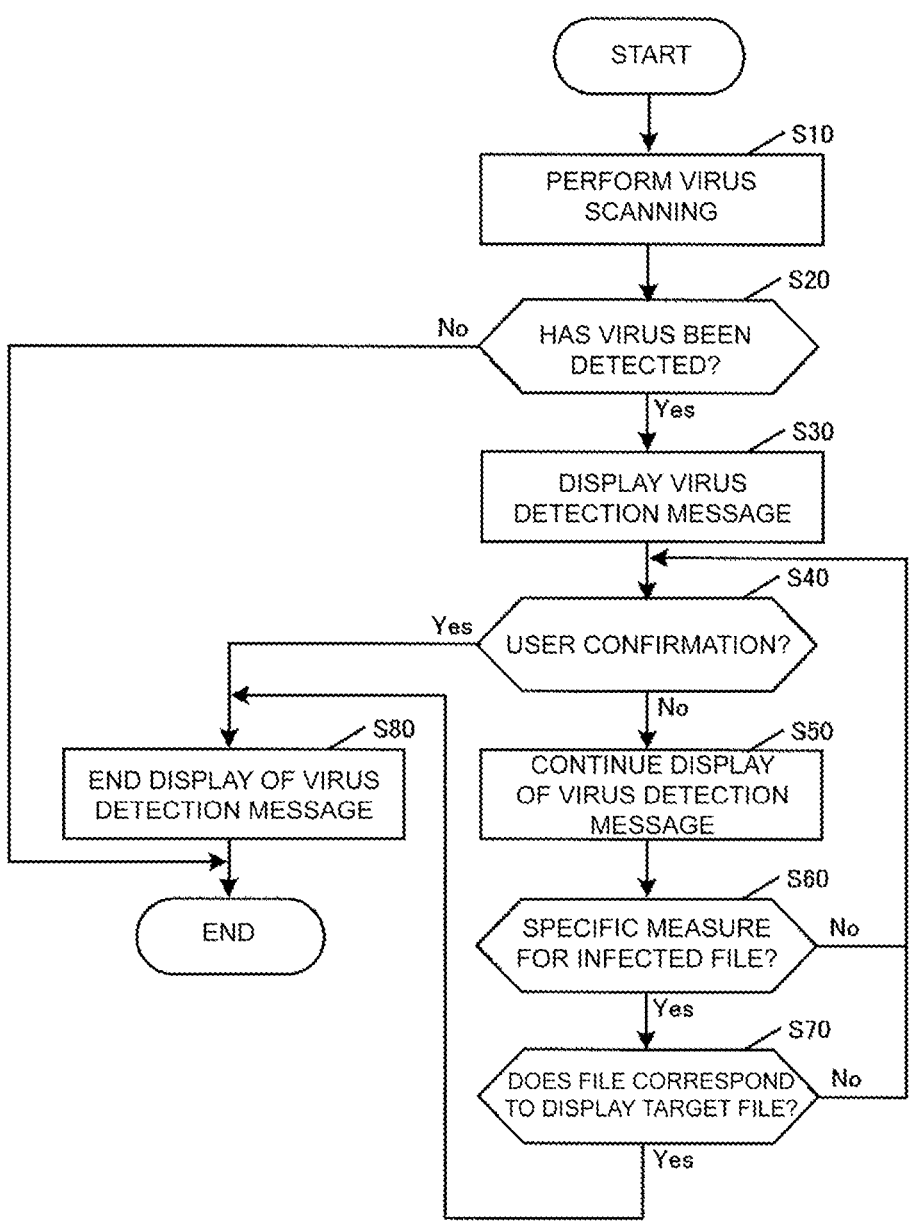
FIG. 4 is a flowchart for explaining a processing flow according to the first embodiment.

Next, a processing flow according to the first embodiment will be described. FIG. 4 is a flowchart for explaining overall processing according to the first embodiment. Note that the processing described in FIG. 4 is processing executed by the controller 11 mainly reading the display control program 232, the file management program 233, the antivirus program 234, and the like.

First, the controller 11 reads the virus detection program 2341 on a preset schedule or at a timing of choice at which an execution instruction is input by the user, and executes a virus scanning (Step S10).

The controller 11 determines whether a virus has been detected from the file to be subjected to the virus scanning (Step S20). When it is determined that no virus has been detected, the controller 11 ends the processing (Step S20; No→"end").

On the other hand, in a case where it is determined that a virus has been detected, the controller 11 associates information regarding the infected file infected with the virus with the file ID and stores the information in the file information storage area 235 as the file information table. The controller 11 reads the virus notification program 2342 and creates the virus detection message indicating that a virus has been detected as notification content based on the file information table. The controller 11 displays the created virus detection message on the display 13 (Step S20; Yes→Step S30).

The controller 11 determines whether the virus detection message displayed on the display 13 has been checked by the user (Step S40). In this case, the controller 11 can determine that the virus detection message has been checked by the user by receiving selection of a confirmation button provided on a display screen of the virus detection message, which will be described later, a delete instruction button of the message, or the like.

In a case where it is determined that the virus detection message displayed on the display 13 has been checked by the user, the controller 11 ends the display of the virus detection message and ends the processing (Step S40; Yes→Step S80).

On the other hand, in a case where it is determined that the virus detection message displayed on the display 13 has not been checked by the user, the controller 11 continues the display of the virus detection message (Step S40; No→Step S50).

The controller 11 determines whether the specific measure has been taken for the infected file by reading the determination program 2343 (Step S60). The specific measure for the infected file is an operation/action, processing, command reception, or the like for realizing cleaning, deletion, or isolation of the virus, such as disconnection from the external storage device or the like storing the infected file, deletion of the infected file, transfer of the infected file, or update of the infected file (cleaning of the virus from the infected file).

In a case where it is determined that the specific measure has not been taken for the infected file, the controller 11 repeats the processing from Step S40 (Step S60; No→Step S40).

On the other hand, in a case where it is determined that the specific measure has been taken for the infected file, the controller 11 determines whether the infected file corresponds to the display target file in the virus detection message (Step S60; Yes→Step S70). In a case where it is determined that the infected file subjected to the specific measure corresponds to the display target file in the virus detection message, the controller 11 ends the display of the virus detection message and ends the processing (Step S70; Yes→Step S80). On the other hand, in a case where it is determined that the infected file subjected to the specific measure does not correspond to the display target file in the virus detection message, the controller 11 repeats the processing from Step S40 (Step S70; No→Step S40).

Note that determination processing may be provided between Step S60 and Step S70 to determine whether access to the infected file is disabled as a result of taking the specific measure for the infected file. In this case, in a case where it is determined that the infected file is inaccessible, the controller 11 moves on to the processing in Step S70. On the other hand, in a case where it is determined that the infected file is accessible, the operation on the infected file is possible, and it is thus only necessary to return the processing to Step S40.

Figure 5:
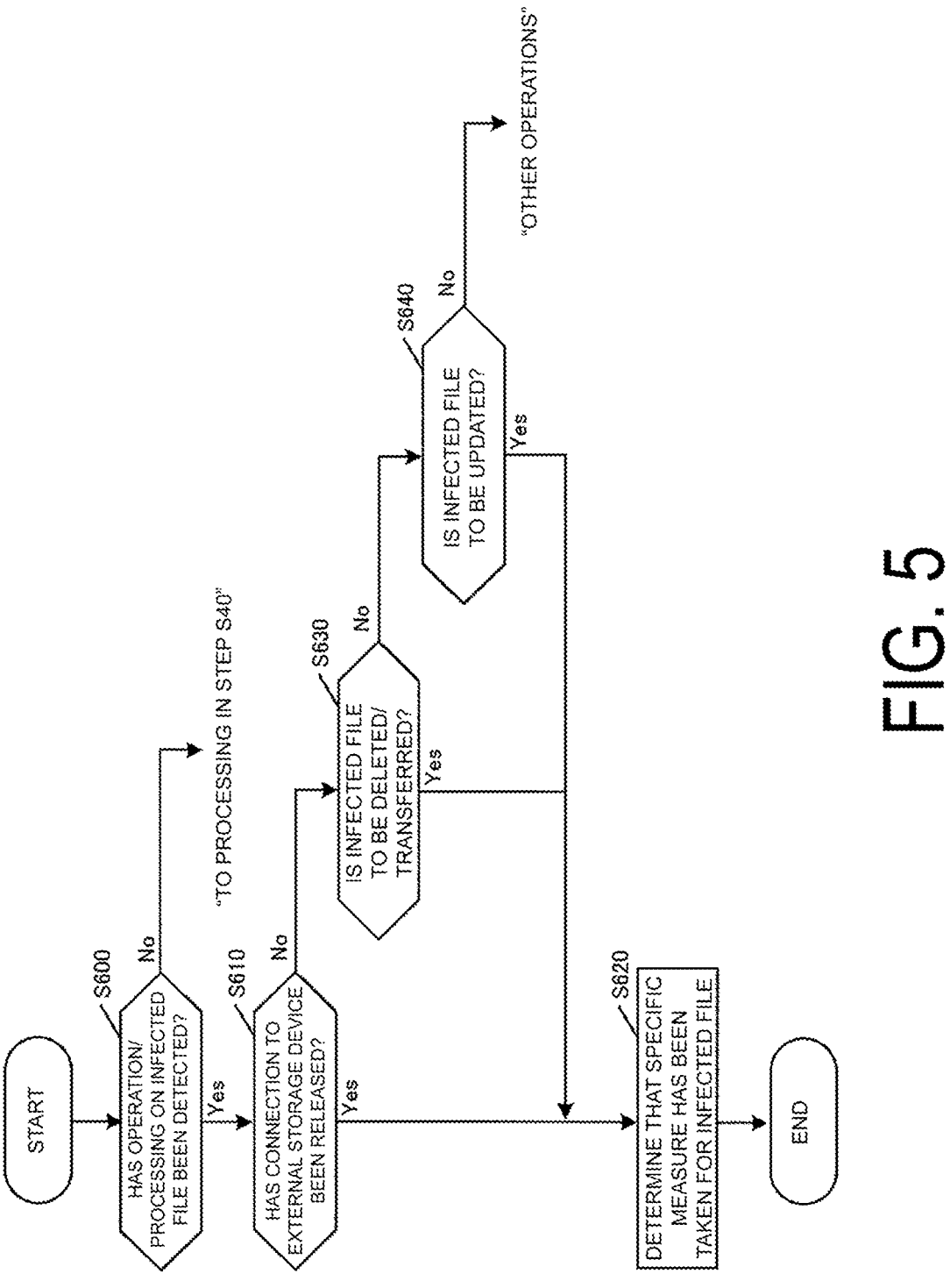
FIG. 5 is a flowchart for explaining a processing flow according to the first embodiment.

Next, the processing of determining whether the specific measure has been taken for the infected file will be described using the flowchart in FIG. 5. Note that the processing described in the flowchart of FIG. 5 is processing corresponding to Step S60 in FIG. 4 and is processing executed by the controller 11 mainly reading the file management program 233, the determination program 2343, and the like.

First, the controller 11 reads the file management program 233, the determination program 2343, and the like, and detects an operation/processing on the infected file (Step S600). In a case where the operation/processing on the infected file is not detected, the controller 11 moves on to the processing in Step S40 in FIG. 5 (Step S600; No→"to the processing in Step S40").

In a case where the operation/processing on the infected file is detected, the controller 11 determines whether the operation/processing is related to disconnection from the external storage device (Step S600; Yes→Step S610). In a case where it is determined that the operation/processing on the infected file is related to the disconnection from the external storage device, the controller 11 determines that the specific measure for the infected file has been taken (Step S610; Yes→Step S620).

On the other hand, in a case where it is determined that the operation/processing on the infected file is not related to the disconnection from the external storage device, the controller 11 determines whether the operation is related to deletion or transfer of the infected file (Step S610; No→Step S630). In a case where it is determined that the operation/processing on the infected file is related to deletion or transfer of the infected file, the controller 11 determines that a specific measure for the infected file has been taken (Step S630; Yes→Step S620).

On the other hand, in a case where it is determined that the operation/processing on the infected file is not related to deletion or transfer of the infected file, the controller 11 determines whether the operation/processing is related to updating of the infected file (Step S630; No→Step S640). In a case where it is determined that the operation/processing on the infected file is related to updating of the infected file, the controller 11 determines that the specific measure for the infected file has been taken (Step S640; Yes→Step S620). Note that in a case where it is determined that the operation/processing on the infected file is not related to the update of the infected file, the controller 11 determines that the operation/processing is another operation (Step S640; No→"another operation").

Figure 8:
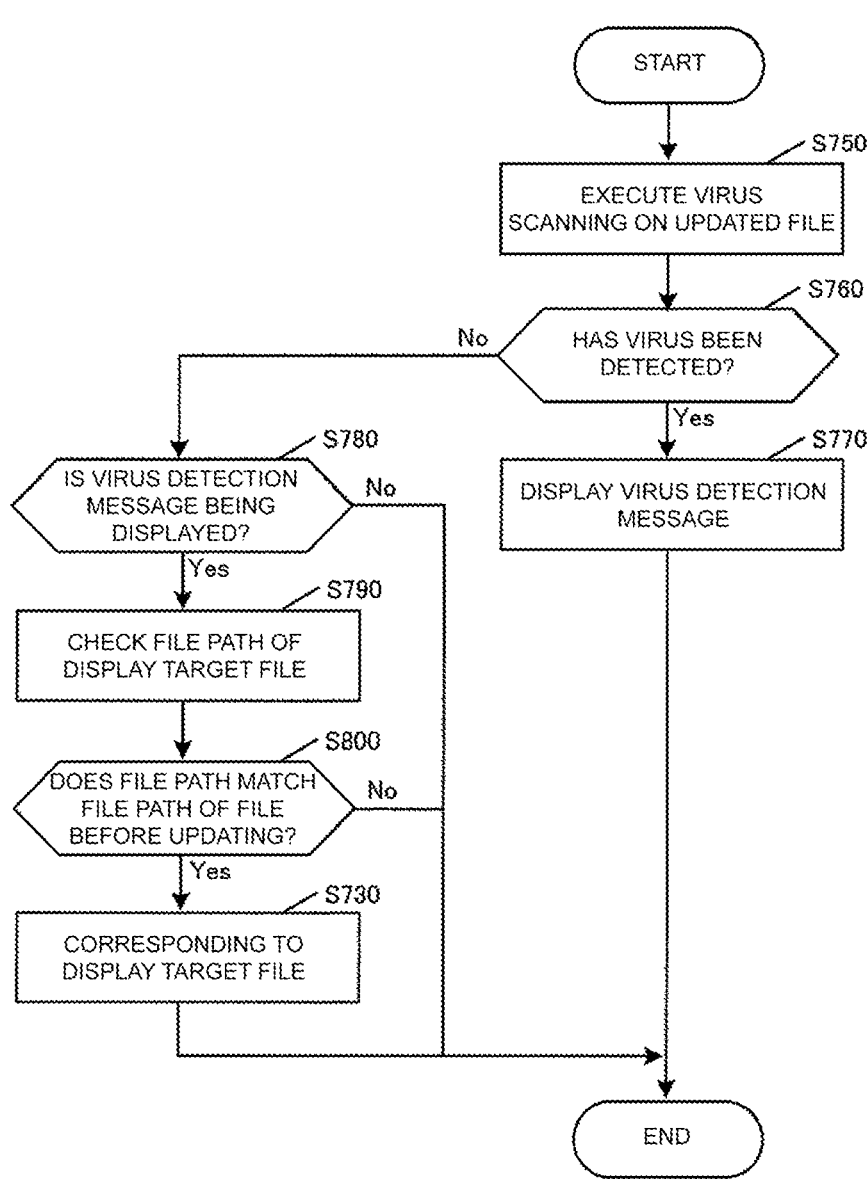
FIG. 8 is a flowchart for explaining a processing flow according to the first embodiment.

Next, processing of determining whether the infected file corresponds to the display target file in the virus detection message in a case where the specific measure has been taken for the infected file will be described using the flowcharts in FIG. 6 to FIG. 8. Note that the processing described in the flowcharts in FIG. 6 to FIG. 8 is processing corresponding to Step S70 in FIG. 4 and is processing executed by the controller 11 mainly reading the determination program 2343.

FIG. 6 is a flowchart for explaining determination processing in a case where the operation/processing for the infected file is an operation related to disconnection from the external storage device.

If it is determined in Step S60 of FIG. 4 that the specific measure has been taken for the infected file, the controller 11 checks the file path of the display target file (Step S710).

Next, the controller 11 determines whether the storage position of the file represented by the checked file path matches the disconnected external storage device (Step S720). In a case where the storage position of the display target file represented by the file path matches the disconnected external storage device, the controller 11 determines that the infected file corresponds to the display target file and ends the processing (Step S720; Yes→Step S730). On the other hand, in a case where the storage position of the display target file represented by the file path does not match the disconnected external storage device, the controller 11 ends the processing (Step S720; No→"end").

FIG. 7 is a flowchart for explaining determination processing in a case where an operation/processing on the infected file is an operation related to deletion or transfer of the infected file.

If it is determined in Step S60 of FIG. 4 that the specific measure has been taken for the infected file, the controller 11 checks the file path of the display target file (Step S710).

Next, the controller 11 determines whether the checked file path matches the file path of the deletion source or the movement source of the infected file (Step S740). In a case where the file path matches the file path of the deletion source or the movement source of the infected file, the controller 11 determines that the infected file corresponds to the display target file and ends the processing (Step S740; Yes→Step S730). On the other hand, in a case where the file path does not match the file path of the deletion source or the movement source of the infected file, the controller 11 ends the processing (Step S740; No→"end").

FIG. 8 is a flowchart for explaining determination processing in a case where an operation on the infected file is an operation related to updating of the infected file. Note that the operation related to the updating of the infected file in FIG. 8 in the mode in which an operation of performing virus scanning on the updated data file is added will be described.

In a case where it is determined in Step S60 of FIG. 4 that the specific measure has been taken for the infected file, the controller 11 performs virus scanning on the updated data file (Step S750).

In a case where it is determined that a virus has been detected, the controller 11 displays a virus detection message for the updated data file and ends the processing (Step S760; Yes→Step S770).

On the other hand, in a case where it is determined that a virus has not been detected, the controller 11 determines whether a virus detection message is being displayed (Step S760; No→Step S780).

In a case where it is determined that the virus detection message is being displayed, the controller 11 checks the file path of the display target file (Step S780; Yes→Step S790).

Next, the controller 11 determines whether the file path of the display target file matches the file path of the infected file that is the data file before the updating (Step S800). In a case where the file path matches the file path of the infected file, the controller 11 determines that the infected file corresponds to the display target file and ends the processing (Step S800; Yes→Step S730). On the other hand, in a case where the file path does not match the file path of the infected file, the controller 11 ends the processing (Step S800; No→"end").

1.3 Operation Example

Figure 9:
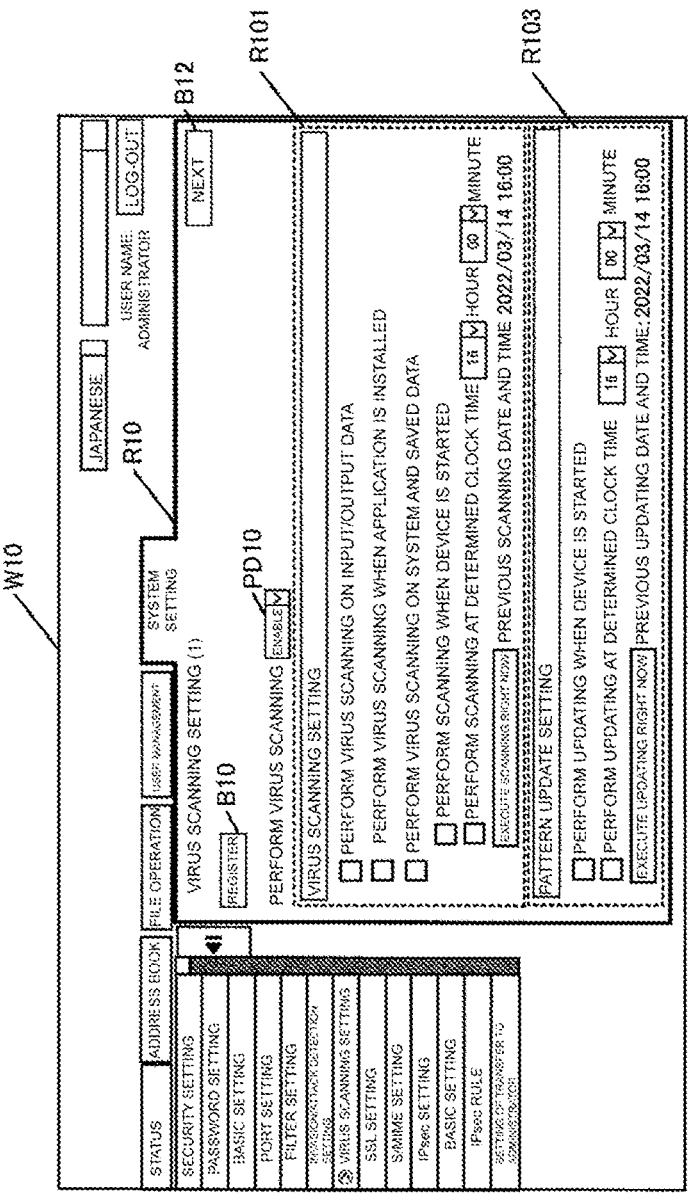
FIG. 9 is a diagram for explaining an operation example according to the first embodiment.
Figure 10:
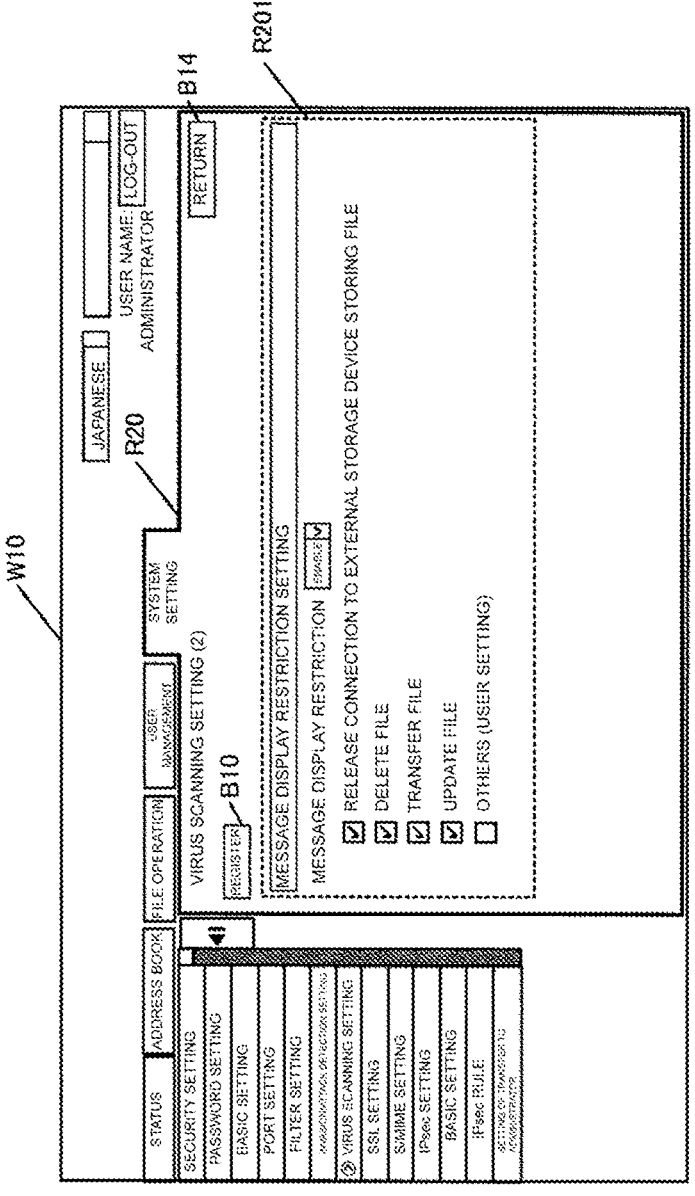
FIG. 10 is a diagram for explaining an operation example according to the first embodiment.

Next, an operation example according to the first embodiment will be described. FIG. 9 and FIG. 10 are diagrams for explaining a configuration example of a display screen W10 that can be displayed on the display 13 by the multifunction peripheral 10. The display screen W10 is a display screen on which device information such as the status of the multifunction peripheral 10, an address book, and system settings can be collectively displayed for each tab. Referring to FIG. 9 and FIG. 10, settings related to virus scanning that can be set via the system setting tab on the display screen W10 will be described.

The display screen W10 can be displayed by, for example, receiving selection of a display button provided on a home screen or the like, which is not illustrated. The display screen W10 can also be displayed as a Web-UI using a Web browser on a terminal device, such as a personal computer (PC) or a smart phone, which is not illustrated. In this case, the terminal device is configured to be able to output the setting content related to the virus scanning or the like received via the Web-UI to the multifunction peripheral 10.

FIG. 9 is a diagram illustrating a first virus scanning setting area R10 included in the system setting tab.

The first virus scanning setting area R10 includes a "perform virus scanning" pull-down PD10, a virus scanning setting area R101, a pattern update setting area R103, a registration button B10, and a next button B12.

The "perform virus scanning" pull-down PD10 is a pull-down for receiving setting of enabling/disabling of execution of the virus scanning.

The virus scanning setting area R101 is a setting area for receiving settings of data (file) type as a target of the virus scanning, a setting of an execution schedule of the virus scanning, and the like. The virus scanning setting area R101 includes, as items for receiving settings of the data type as a target of the virus scanning: a "performing virus scanning on input/output data" check box for performing virus scanning on input/output data as a target at the time of an input or an output of data to or from the multifunction peripheral 10; a "performing virus scanning when an application is installed" check box for performing virus scanning on firmware update data, application data, or the like at the time of updating of firmware or installation of the application; a "performing virus scanning on a system or saved data" check box for performing virus scanning on the system or saved data (for example, apparatus setting data or data saved in a shared folder, a fax reception folder, or the like); and the like.

Note that examples of the input/output data to be subjected to the virus scanning by selecting the "performing virus scanning of input/output data" check box include job data, address book data, and document filing data (data in which a copied or faxed document, print data, scan data, or the like is stored such that they can be called when necessary) related to each mode.

The virus scanning setting area R101 includes, as items for receiving settings of the execution schedule of the virus scanning; a "performing scanning when the apparatus is started" check box for executing virus scanning when the multifunction peripheral 10 is started; a "performing scanning at a determined clock time" check box for executing virus scanning at a set clock time; an "executing scanning right now" button for immediately executing virus scanning (on-demand scanning) in response to a user operation; and the like.

The pattern update setting area R103 includes, as items for receiving the update settings (update schedule) of a virus definition file; a "performing updating when the apparatus is started" check box for updating the virus definition file when the multifunction peripheral 10 is started; a "performing updating at a determined clock time" check box for updating the virus definition file at a set clock time; a "executing updating right now" button for updating the virus definition file (on-demand updating) in response to a user operation; and the like.

The user can register the virus scanning setting by setting the "perform virus scanning" pull-down PD10 to be enabled, and designating a desired data type as a target of the virus scanning, designating an execution schedule of the virus scanning, or perform updating setting of the virus definition file, and selecting the registration button B10 in the virus scanning setting area R101 and the pattern update setting area R103.

Note that the next button B12 is a button for receiving an instruction for screen transition to a second virus scanning setting area R20, which will be described with reference to FIG. 10. Once an instruction for selecting the next button B12 is received from the user, the controller 11 displays the second virus scanning setting area R20, which will be described with reference to FIG. 10.

The second virus scanning setting area R20 illustrated as an example in FIG. 10 includes a message display restriction setting area R201, a registration button B10, and a return button B14.

The message display restriction setting area R201 is a setting area for receiving settings for restricting display of the virus detection message indicating virus infection has occurred as notification content. The message display restriction setting area R201 includes: a "message display restriction" pull-down for receiving setting of enabling/disabling of the display restriction of the virus detection message; and selection check boxes for receiving selection of specific measures to which the display restriction of the virus detection message is to be applied (such as "disconnection to an external storage device storing the file", "deletion of the file", "transfer of the file", "updating of the file", and "others (user setting)").

In a case where the user desires to restrict the display of virus detection messages based on the specific measure for the infected files, the user selects "enable" from the "message display restriction" pull-down. The user can select the specific measures for which the display restriction is applied to the virus detection message by checking the selection check box corresponding to the desired specific measures.

Figure 11:
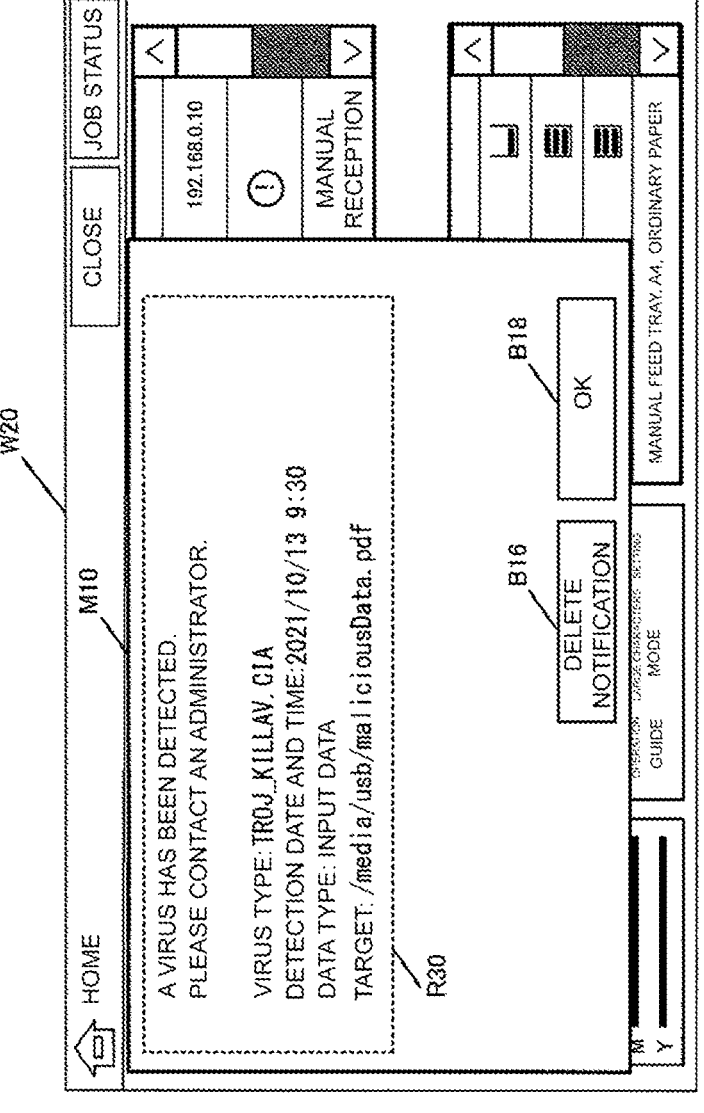
FIG. 11 is a diagram for explaining an operation example according to the first embodiment.

Next, a display mode of the virus detection message according to the first embodiment will be described with reference to FIG. 11 to FIG. 13. FIG. 11 is a diagram for explaining a configuration example of a virus detection message M10 indicating that a virus has been detected as display content in a case where the virus has been detected, and corresponds to the file ID "#00010" in FIG. 3. Note that the virus detection message M10 illustrated as an example in FIG. 11 is a display example in which the message is displayed in a superimposed manner on the display screen W20 displayed on the display 13 of the multifunction peripheral 10. Note that the virus detection message M10 can also be displayed via a Web browser on a terminal device, such as a PC or a smartphone, which is not illustrated.

The virus detection message M10 includes a message display area R30, a button B16 for deleting the notification, and an OK button B18. The message display area R30 is a display area for displaying a message (notification) indicating that a virus has been detected as display content. FIG. 11 illustrates an example of display content: "A virus has been detected. Please contact an administrator . . . . Virus type: TROJ_KILLAV.CIA, detection date and time: 2021/10/13 9:30, data type: input data, target:/media/usb/maliciousData.pdf" as indication of virus detection. FIG. 11 illustrates an example case where an external storage device such as a USB memory is connected to the multifunction peripheral 10 and input data "maliciousData.pdf" stored in the external storage device has been infected with the virus.

Figure 12:
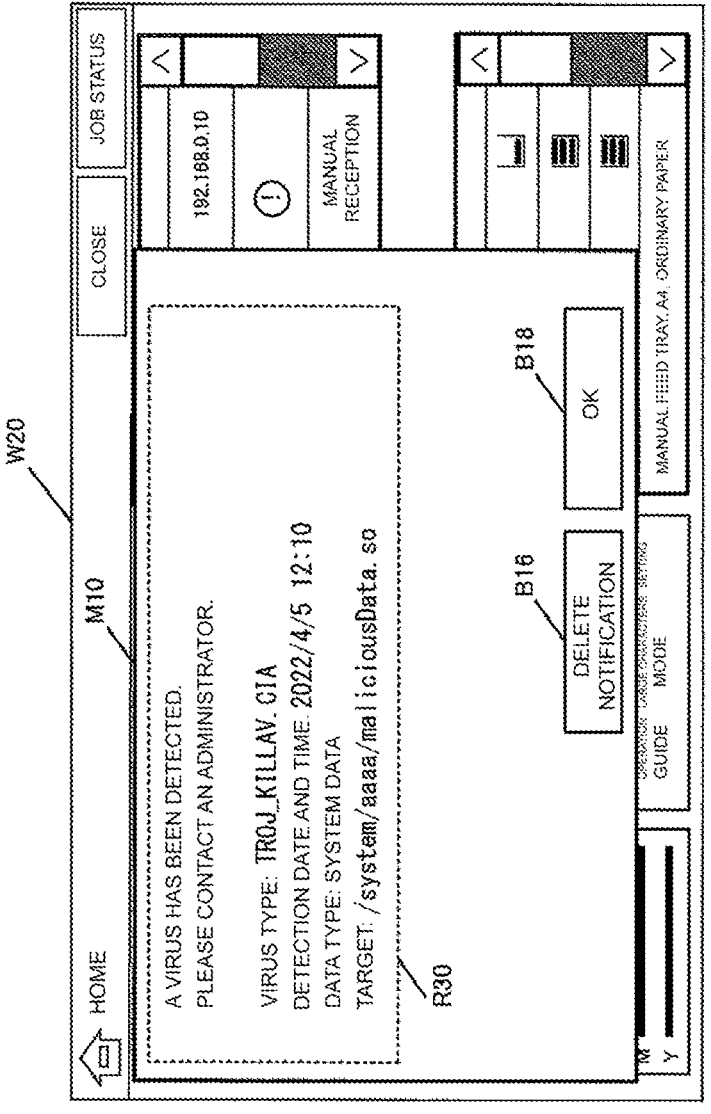
FIG. 12 is a diagram for explaining an operation example according to the first embodiment.
Figure 13:
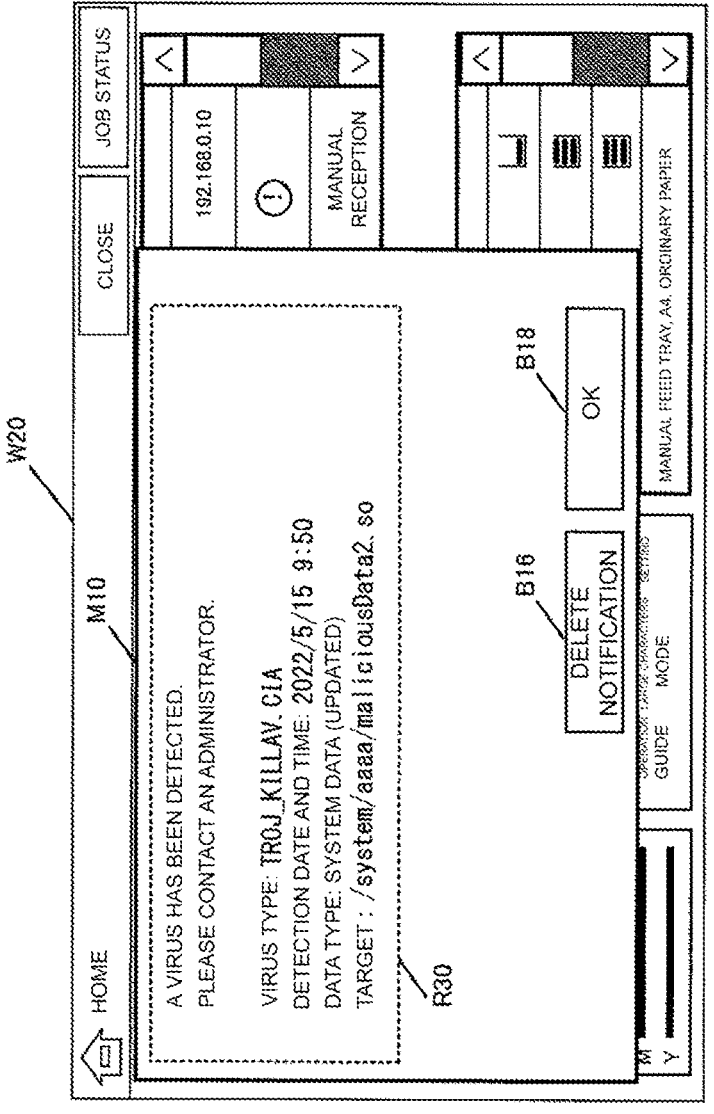
FIG. 13 is a diagram for explaining an operation example according to the first embodiment.

Similarly, FIG. 12 corresponds to the file ID "#04123" in FIG. 3 and illustrates an exemplary case where system data "maliciousData.so" has been infected with a virus, and FIG. 13 corresponds to the file ID "#04133" in FIG. 3 and illustrates an exemplary case where system data "maliciousData2.so" has been infected with a virus.

The button B16 for deleting the notification is a button for receiving an instruction to delete the virus detection message M10. Once the user selects the button B16 for deleting the notification, the controller 11 terminates the display of the virus detection message M10 and deletes the information on the corresponding infected file from the file information table.

The OK button B18 is a button for receiving an input of an instruction to check the virus detection message M10 from the user. Once the user selects the OK button B18, the controller 11 ends the display of the virus detection message M10. In a case where the user selects the OK button B18, the controller 11 does not delete the information regarding the corresponding infected file from the file information table. It is possible to reuse the information regarding the infected file held by the file information table even in a case where the connection to the external storage device storing the infected file is once released and is then established again, for example, by employing a configuration in which the information regarding the infected file is held by the file information table. This has the advantage that it is not necessary to generate the virus detection message regarding the infected file again.

In the first embodiment, a specific measure such as disconnection from the external storage device or the like storing the infected file, deletion of the infected file, transfer of the infected file, or updating of the infected file has been made, and the infected file regarding the specific measure corresponds to the display target file in the virus detection message illustrated as an example in FIG. 11 to FIG. 13, the display of the virus detection message is restricted.

In other words, in the example illustrated in FIG. 11, for example, the controller 11 determines that the virus has been cleaned and restricts (ends) the display of the virus detection message M10 regarding FIG. 11 in a case where the connection between the multifunction peripheral 10 and the USB memory as the external storage device storing the infected file "maliciousData.pdf." is released and access from the multifunction peripheral 10 to the infected file "maliciousData.pdf" is not possible.

Similarly, in the example illustrated in FIG. 12, for example, the controller 11 determines that the virus has been cleaned and restricts (ends) the display of the virus detection message M10 regarding FIG. 12 in a case where the infected file "maliciousData.so" has been deleted or transferred from the multifunction peripheral 10 and access from the multifunction peripheral 10 to the infected file "maliciousData.so" is not possible.

In the example illustrated in FIG. 13, for example, the controller 11 restricts (ends) the display of the virus detection message M10 regarding FIG. 13 in a case where the virus has been cleaned from the infected file "maliciousData2.so" by the infected file "maliciousData2.so" being updated.

Note that although the mode in which the display of the virus detection message M10 is restricted depending on whether the specific measure has been taken for the infected file has been described in the description using FIG. 11 to FIG. 13, the display mode of the virus detection message M10 is not limited thereto. For example, it is also possible to minimize the display (for example, a bar icon or the like) such that re-display in the original image size at a location of choice inside the display screen W20 can be performed instead of completely ending the display of the virus detection message M10. Also, a re-display button for receiving an instruction to re-display the virus detection message M10, the display of which has been ended, may be additionally provided.

As described above, the first embodiment is configured such that the display indicating that the virus has been detected is restricted in the case where the infected file from which the virus has been cleaned as a result of the specific measure corresponds to the infected file as a target of the display indicating that the virus has been detected, and it is thus possible to provide the notification regarding the virus detection without leading to confusion of the user. It is also possible to restrict the display indicating that the virus has been detected for the infected file from which the virus has been cleaned as a target of the display and thereby to prevent a negative effect caused by the display continuously occupying the display screen.

2. Second Embodiment

A second embodiment is a mode in which display content indicating that a virus has been detected can be displayed in an updated manner in a case where an infected file from which the virus has been cleaned as a result of a specific measure corresponds to an infected file as a target of the display indicating that the virus has been detected.

2.1 Functional Configuration

Figure 14:
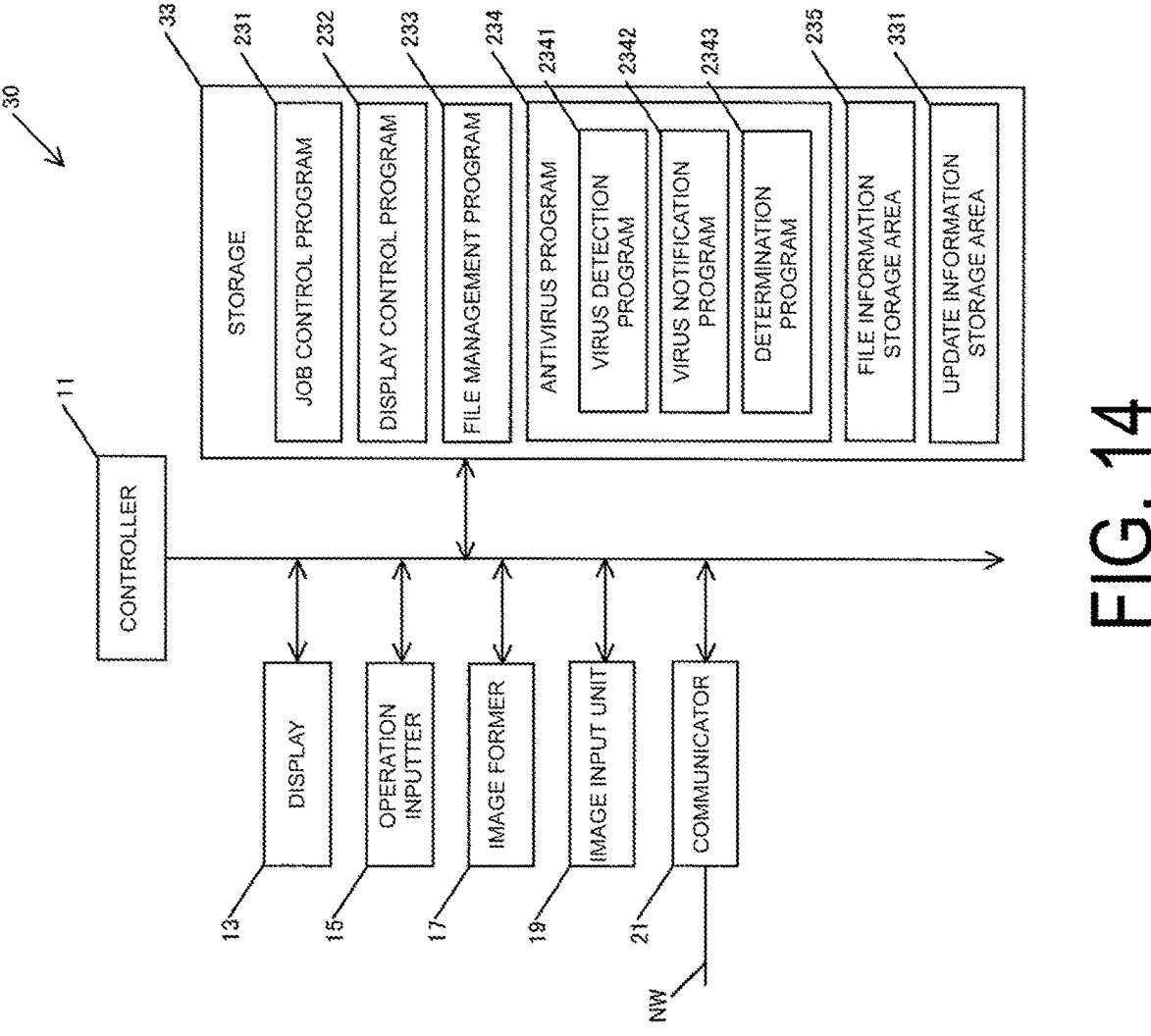
FIG. 14 is a diagram for explaining a functional configuration of a multifunction peripheral according to a second embodiment.

FIG. 14 is a functional configuration diagram of a multifunction peripheral 30 according to the second embodiment. The functional configuration of the multifunction peripheral 30 according to the second embodiment is different from the functional configuration of the multifunction peripheral 10 according to the first embodiment in that a storage 33 is provided instead of the storage 23. Since other configurations can be the same as those of the multifunction peripheral 10, description thereof is omitted here.

In the second embodiment, the storage 33 stores a job control program 231, a display control program 232, a file management program 233, and an antivirus program 234, and secures a file information storage area 235 and an update information storage area 331.

The update information storage area 331 is a storage area that stores, as update information, information regarding virus cleaning such as a specific measure (cleaning (deletion) reason) that has led to the cleaning of the virus.

The update information table stored in the update information storage area 331 will now be described with reference to FIG. 15. The update information table includes a file ID, a cleaning (deletion) reason, a target item (before cleaning), a target item (after cleaning), and a cleaning date and time as storage items.

The file ID is an identifier for uniquely identifying a file to be managed by the multifunction peripheral 30, and has the same value as the file ID managed in the file information table illustrated as an example in FIG. 3. The cleaning (deletion) reason represents a specific action that led to the cleaning of the virus. The target item (before cleaning) represents a file name of the infected file which is a target file of virus cleaning. The target item (after cleaning) represents a target item after virus cleaning. Note that the target item (after cleaning) can be left blank in a case where the connection to the external storage device is released, or in a case where the infected file itself has been deleted and access thereto is not possible. The cleaning date and time represents the date and time when the virus has been cleaned.

For example, the infected file identified by the file ID "#00010" is an example infected file, access to which is not possible as a result of releasing the connection to the external storage device storing the infected file, from which the virus has been cleaned. Since "maliciousData.pdf" which is the infected file (target item (before cleaning)) cannot be accessed after the virus cleaning, the target item (after cleaning) is left blank.

On the other hand, the infected file identified by the file ID "#04133" is an example infected file from which the virus has been cleaned as a result of updating the infected file. "maliciousData2.so" which is an infected file (target item (before cleaning)) is an example infected file that has been updated to "maliciousData2a.so" (target item (after cleaning)) as a result of updating the file.

2.2 Processing Flow

Next, a processing flow according to the second embodiment will be described. The entire processing according to the second embodiment can be processing in which the flowchart of FIG. 4 in the first embodiment is replaced with the flowchart of FIG. 16. Therefore, the same processing is denoted by the same step numbers, and description thereof may be omitted. Note that the processing described with reference to FIG. 16 is executed by the controller 11 mainly reading the display control program 232, the file management program 233, the antivirus program 234, and the like.

Figure 16:
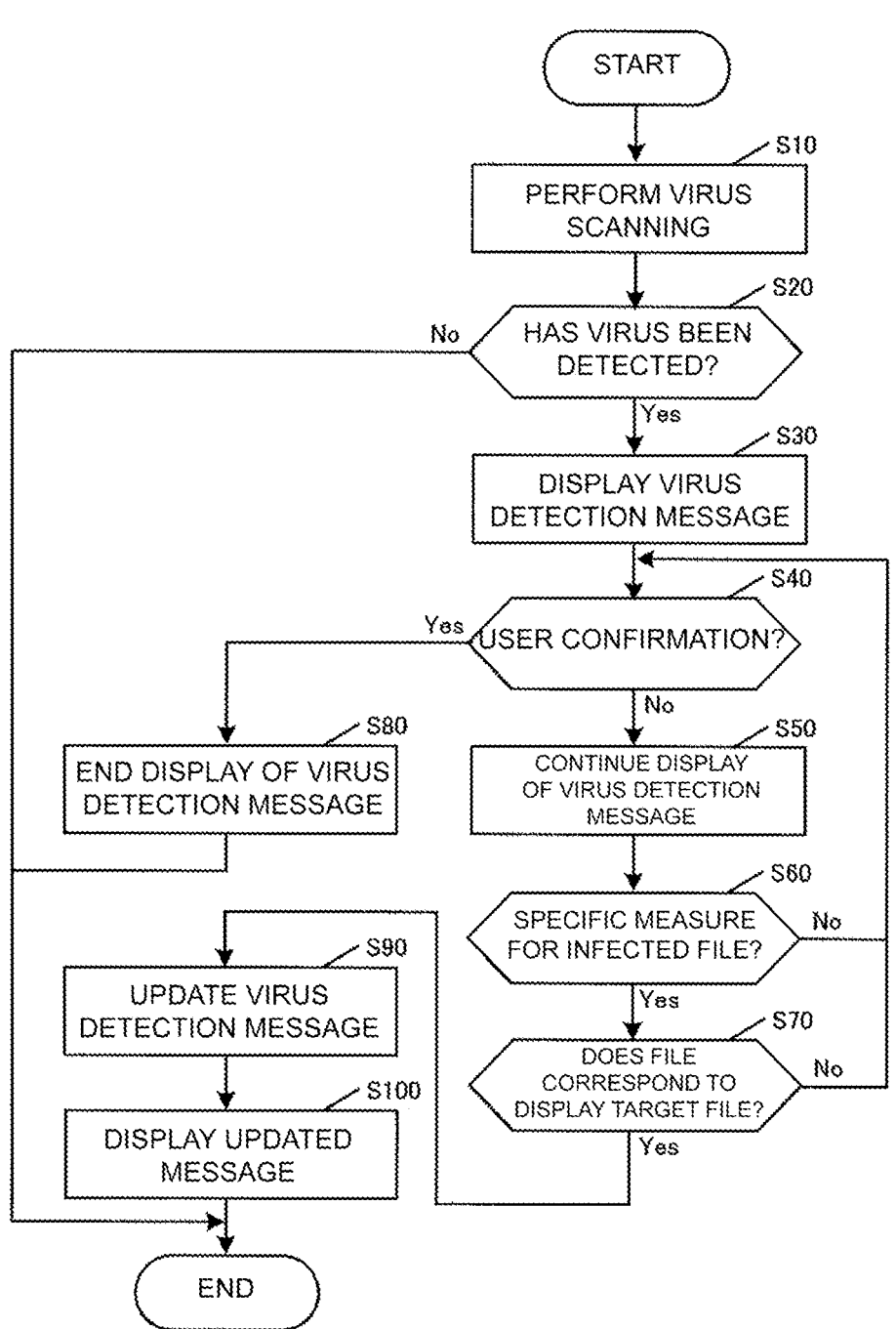
FIG. 16 is a flowchart for explaining a processing flow according to the second embodiment.

In Step S70 of FIG. 16, in a case where it is determined that the infected file subjected to the specific measure corresponds to the display target file in the virus detection message, the controller 11 refers to the update information table illustrated as an example in FIG. 15 and updates the display content of the virus detection message (Step S70; Yes→Step S90). In particular, the controller 11 updates the virus detection message by including the factor related to the cleaning of the virus in the display content of the virus detection message.

The controller 11 displays the updated virus detection message on the display 13 and ends the processing (Step S100). Note that in a case where it is determined that the infected file subjected to the specific measure does not correspond to the display target file in the virus detection message, the controller 11 repeats the processing from Step S40 (Step S70; No→Step S40).

2.3 Operation Example

A display mode of a virus detection message according to the second embodiment will be described with reference to FIG. 17 to FIG. 19. Since a display configuration of a virus detection message M20 illustrated as an example in FIG. 17 to FIG. 19 can be the same as the display configuration of the virus detection message M10 illustrated as an example in FIG. 11, description thereof will be omitted here. The message display area R30 of the virus detection message M20 includes information regarding a factor (specific measure) regarding cleaning of the virus in addition to indication that the virus has been detected.

Figure 17:
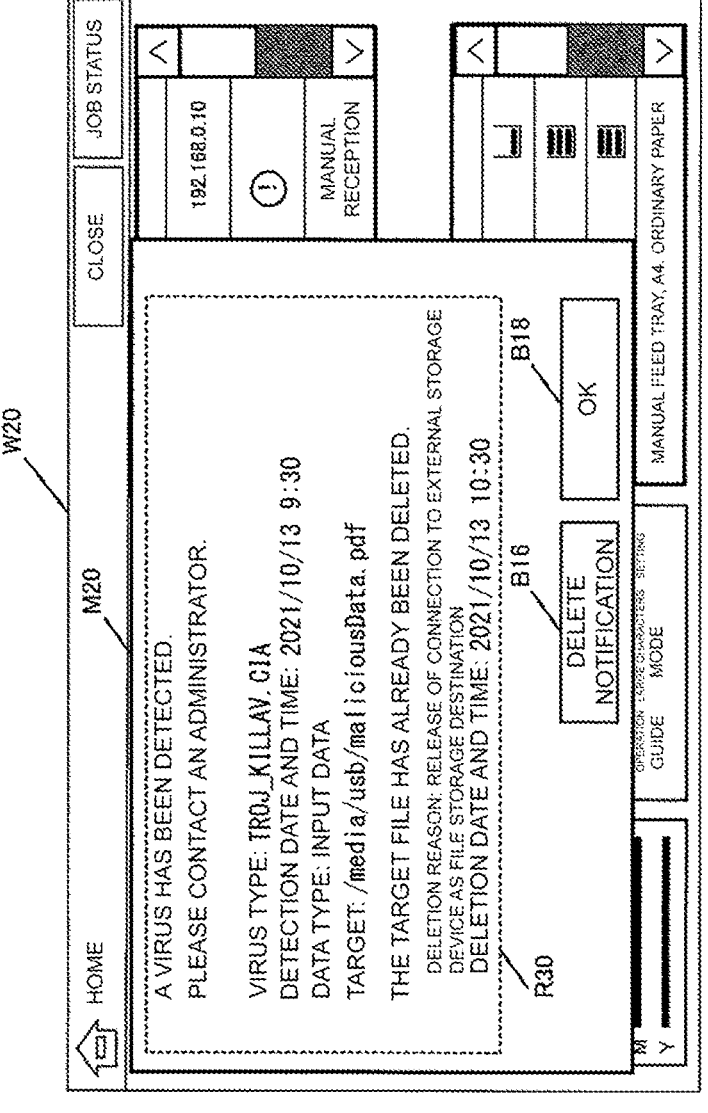
FIG. 17 is a diagram for explaining an operation example according to the second embodiment.

FIG. 17 corresponds to the file ID "#00010" in FIG. 3 (FIG. 15) and illustrates an example in which "The target file has already been deleted . . . deletion reason: disconnection from external storage device as file storage destination, deletion date and time: 2021/10/13/10:30" is added as display content in addition to the display content indicating that the virus has been detected.

Figure 18:
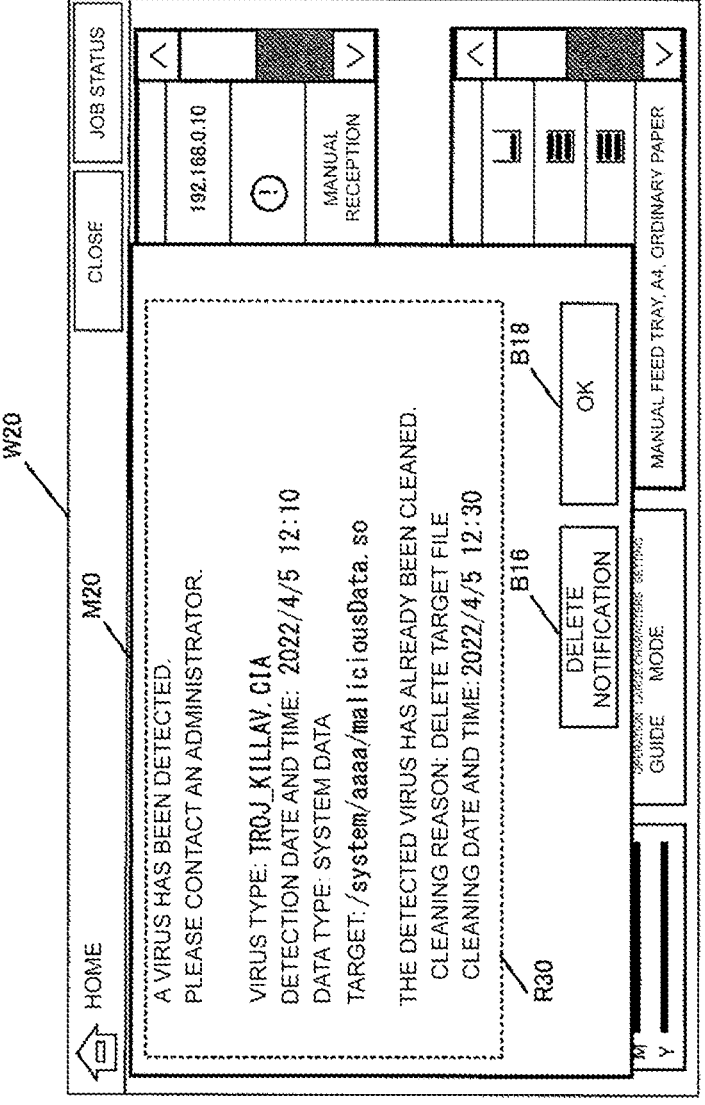
FIG. 18 is a diagram for explaining an operation example according to the second embodiment.

FIG. 18 corresponds to the file ID "#04123" of FIG. 3 (FIG. 15) and is an example in which "The detected virus has already been cleaned . . . cleaning reason: deletion of target file, cleaning date and time: 2022/4/5/12:30" is added as display content in addition to the display content indicating that the virus has been detected.

Figure 19:
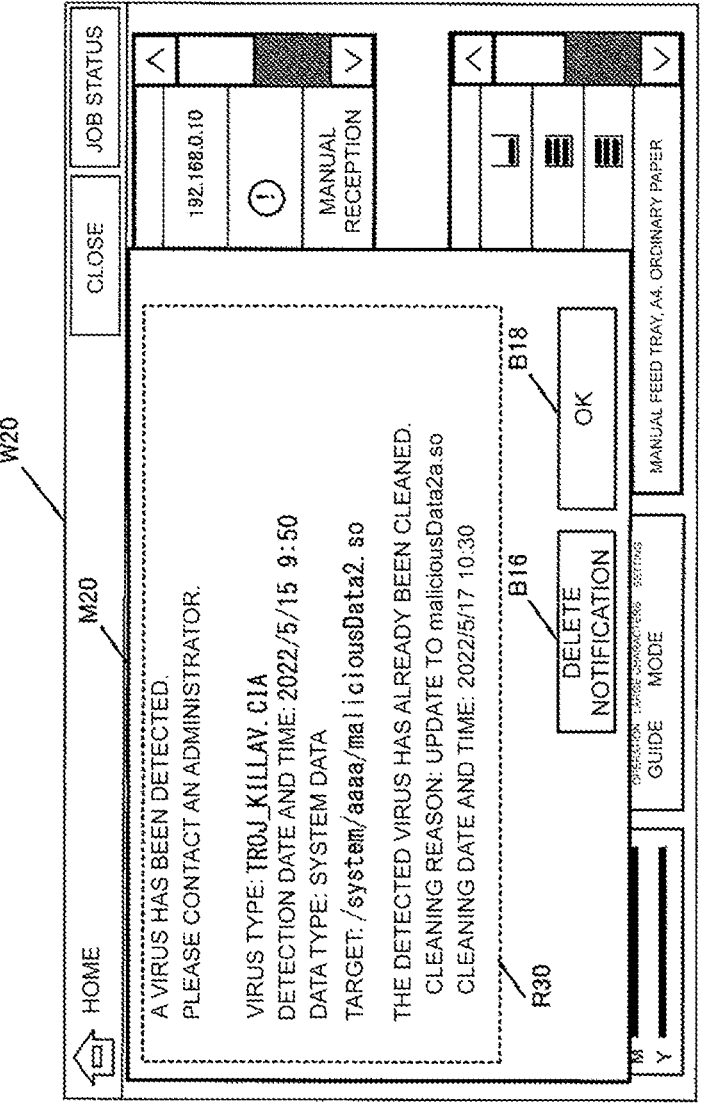
FIG. 19 is a diagram for explaining an operation example according to the second embodiment.

FIG. 19 corresponds to the file ID "#04133" of FIG. 3 (FIG. 15) and is an example in which "The detected virus has already been cleaned . . . cleaning reason: updating to maliciousData2a.so, cleaning date and time: 2022/5/17/10:30" is added as display content in addition to the display content indicating that the virus has been detected.

As described above, according to the second embodiment, in a case where the infected file from which a virus has been cleaned as a result of the specific measure corresponds to the display target file in the virus detection message, it is possible to display the display content indicating that the virus has been detected including the factor of cleaning of the virus caused by the specific measure. Therefore, according to the second embodiment, the user can recognize the fact that the virus has been cleaned by checking the updated virus detection message even in a case where the virus has been unintentionally cleaned as a result of the specific measure, for example.

3. Third Embodiment

A third embodiment has a configuration including, in addition to the configuration in the second embodiment, a notification device that provides a notification that an updated virus detection message is being continuously displayed to the user in a case where the virus detection message has been continuously displayed for a predetermined time or longer in a state where the message is not checked by the user.

3.1 Functional Configuration

Figure 20:
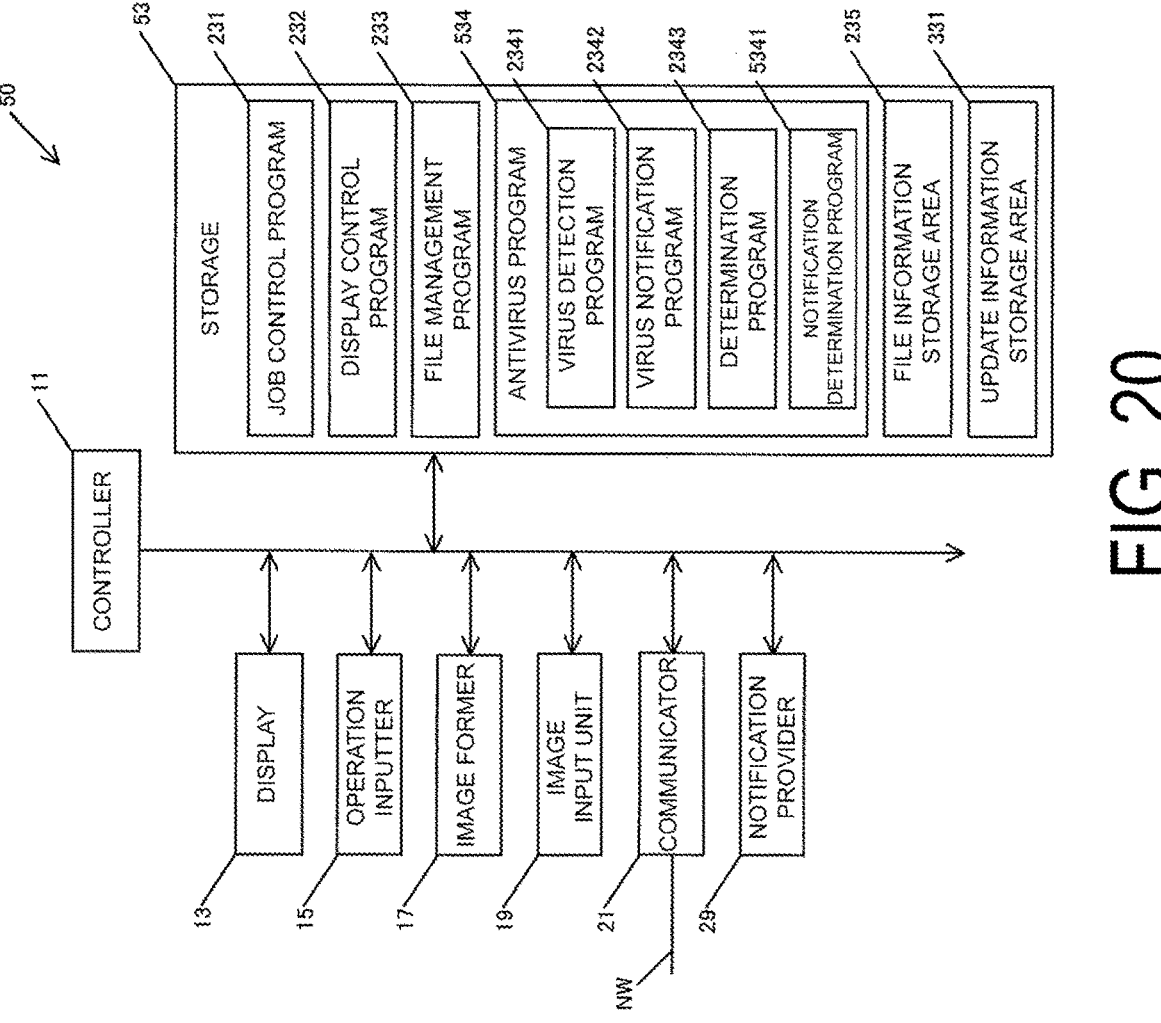
FIG. 20 is a diagram for explaining a functional configuration of a multifunction peripheral according to a third embodiment.

FIG. 20 is a diagram for explaining a functional configuration of a multifunction peripheral 50 according to the third embodiment. The multifunction peripheral 50 includes a notification device 29 and includes a storage 53 instead of the storage 33, in addition to the configuration of the multifunction peripheral 30 according to the second embodiment.

The notification device 29 notifies the user of the fact that the virus detection message has been continuously displayed for a predetermined time or longer based on control performed by the controller 11. A light emitting device such as an LED lamp, a sound (voice) output device such as a voice read-aloud device or a beep sound generating device, or the like, for example, can also be used as the notification device 29, in addition to a character information transmission mechanism such as a Web-UI, an electronic mail, a short message service (SMS), or a fax. The configuration of the notification device 29 is not particularly limited as long as the notification device 29 can notify the user of the fact that the virus detection message has continuously been displayed with the configuration.

The storage 53 according to the third embodiment includes an antivirus program 534 in addition to the configuration of the storage 33. The antivirus program 534 includes a virus detection program 2341, a virus notification program 2342, a determination program 2343, and a notification determination program 5341.

The controller 11 that has read the notification determination program 5341 controls a timing counter such as a timer, which is not illustrated, to measure the elapsed time after the updated virus detection message is displayed on the display 13. In a case where the measured display elapse time exceeds a preset display time threshold value (predetermined time), the controller 11 determines that the virus detection message has been continuously displayed for the predetermined time or longer without being checked by the user.

3.2 Processing Flow

Figure 21:
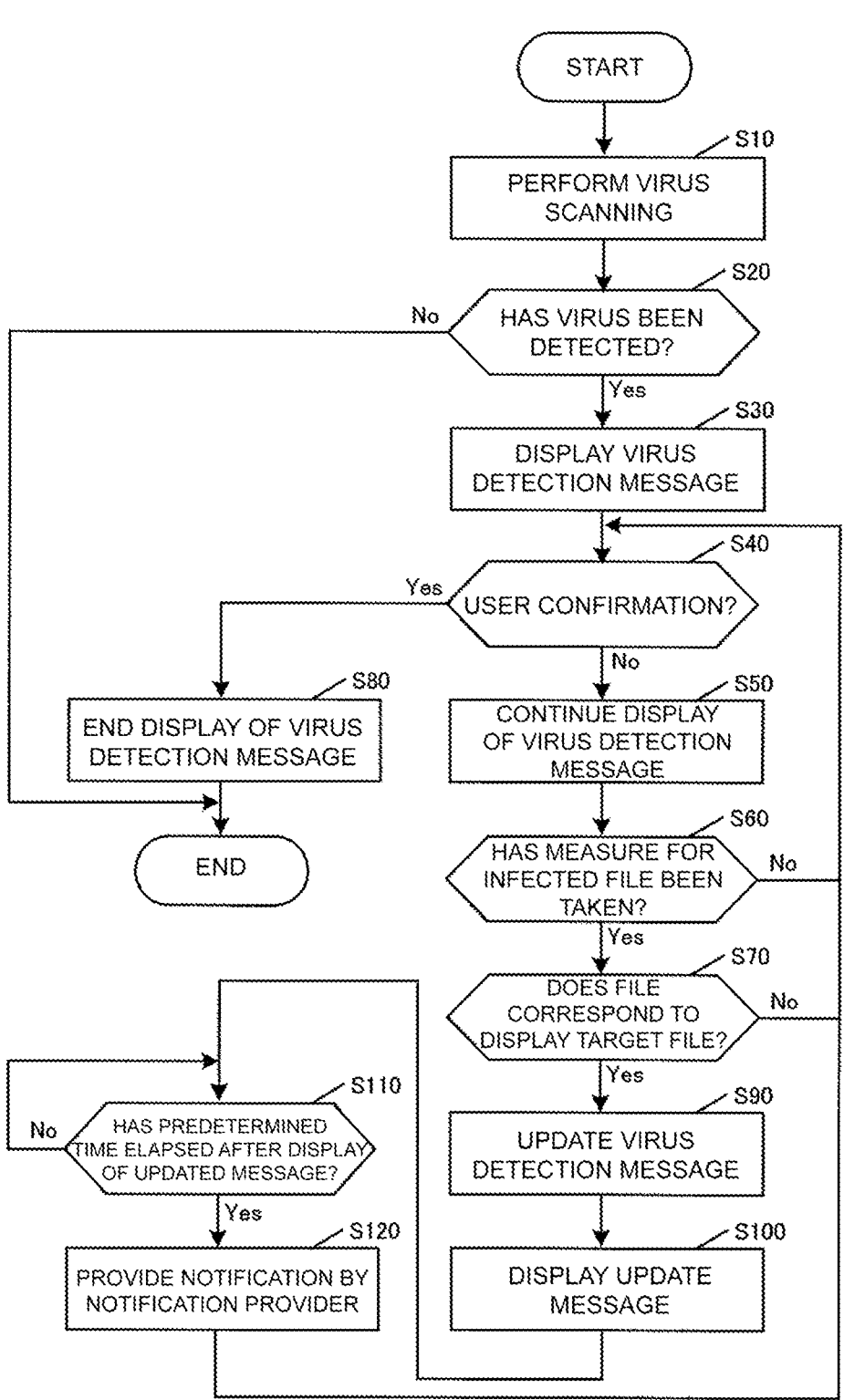
FIG. 21 is a flowchart for explaining a processing flow according to the third embodiment.

A flow of overall processing according to the third embodiment can be processing in which the flowchart of FIG. 16 in the second embodiment is replaced with the flowchart of FIG. 21. Therefore, the same processing is denoted by the same step number, and description thereof is omitted.

The controller 11 executes the processing from Step S10 to Step S100 described in FIG. 16. The controller 11 reads the notification determination program 5341 and determines whether the display elapse time of the updated virus detection message displayed on the display 13 exceeds the preset display time threshold value (predetermined time) (Step S100→Step S110).

In a case where it is determined that the display elapse time of the updated virus detection message exceeds the preset display time threshold value, the controller 11 determines to provide notification by the notification device 29. The controller 11 controls the notification device 29 to notify the user of the fact that the virus detection message has continuously been displayed (Step S110; Yes→Step S120). On the other hand, in a case where it is determined that the display elapse time of the updated virus detection message does not exceed the preset display time threshold value, the controller 11 continues to measure the display elapse time (Step S110; No).

3.3 Operation Example

Figure 22:
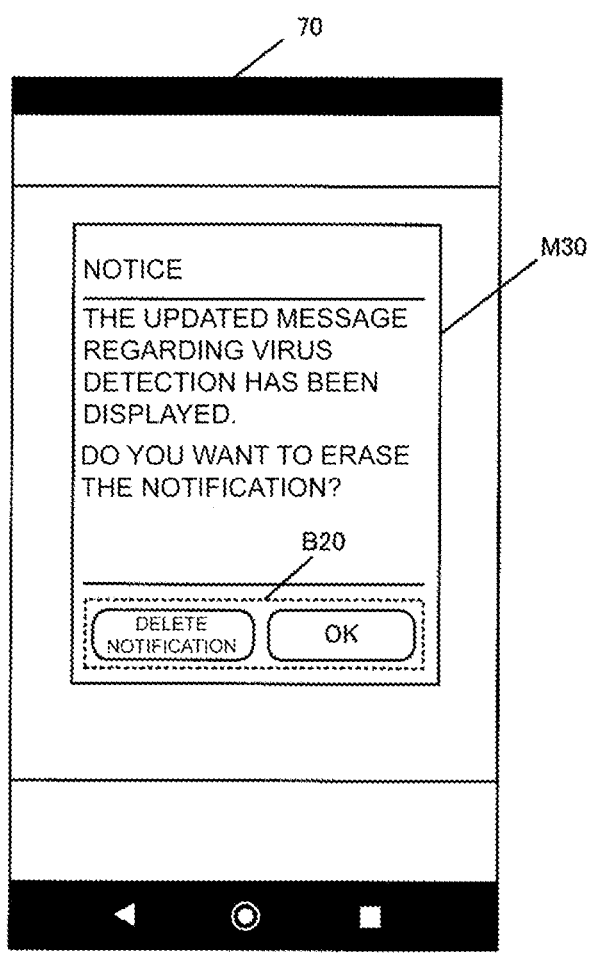
FIG. 22 is a diagram for explaining an operation example according to the third embodiment.

Next, an operation example according to the third embodiment will be described. FIG. 22 is a diagram for explaining a notification example indicating that the virus detection message has continuously been displayed for the user. FIG. 22 illustrates an example in which a message M30 indicating that the updated virus detection message has continuously been displayed is transmitted as an SMS to a terminal device 70 used by the user and the terminal device 70 receives and displays this.

The message M30 includes, as display content, "The updated message regarding virus detection has been displayed. Do you want to delete the notification?" In this case, it is also possible to display the button B16 for deleting the notification described in the first embodiment and the like and an input reception button B20 corresponding to the OK button B18, along with the message M30.

Note that in a case where it is not necessary to display the input reception button B20 or in a case of a device configuration with no transmission mechanism using character information, it is also possible to notify the user of the fact that the virus detection message has continuously been displayed based on a light emitting pattern of a light emitting device and an output pattern of a sound (voice) output device.

As described above, according to the third embodiment, it is possible to notify the user of the fact that the updated virus detection message has continuously been displayed in a case where the updated virus detection message has continuously been displayed for the predetermined time or longer without being checked by the user, in addition to the effects of the second embodiment. Therefore, according to the third embodiment, it is possible to alert a user who has not been aware of the display of the virus detection message, a user who is located away from the multifunction peripheral 50, or the like to check the message.

The present disclosure is not limited to the embodiments described above and can be changed in various manners. In other words, embodiments obtained by combining technical mechanisms appropriately changed without departing from the gist of the present disclosure are also included in the technical scope of the present disclosure.

Although some parts of the above-described embodiments are described separately for convenience of explanation, it is a matter of course that combinations can be executed within a technically allowable range.

The programs running on each device in the embodiments are programs for controlling a CPU or the like (programs for causing a computer to function) to realize the aforementioned functions in the embodiments. The information handled by these devices is temporarily accumulated in a temporary storage device (for example, a RAM) at the time of processing, is then stored in a storage device such as a read only memory (ROM) or an HDD, and is read, corrected, and written by the CPU as needed.

The recording medium storing the programs may be any of a semiconductor medium (for example, a ROM, a non-volatile memory card, or the like), an optical recording medium or a magneto-optical recording medium (for example, a digital versatile disc (DVD), a magneto optical disc (MO), a mini disc (MD), a compact disc (CD), a Blu-ray (trade name) disc (BD) or the like), a magnetic recording medium (for example, a magnetic tape, a flexible disk, or the like), and the like. Not only the aforementioned functions of the embodiments are realized by executing the loaded programs, but also the functions of the present disclosure may be realized by performing processing in cooperation with an operating system, another application program, or the like based on instructions of the programs.

In a case where the programs are distributed to the market, the programs can be stored and distributed in a portable recording medium, or can be transferred to a server computer connected via a network such as the Internet. In this case, it is a matter of course that the storage device of the server computer is also included in the present disclosure.

REFERENCE SIGNS LIST 10, 30, 50 Multifunction peripheral
11 Controller
13 Display
15 Operation inputter
17 Image former
19 Image inputter
21 Communicator
23, 33, 53 Storage
231 Job control program
232 Display control program
233 File management program 234, 534 Antivirus program
235 File information storage area
331 Update information storage area
29 Notification device
70 Terminal device

The invention claimed is:

1. An information processing apparatus comprising:
one or more controllers that detect a virus and perform a specific measure on a file infected with the virus; and
a display that displays that the virus has been detected as display content based on control performed by the one or more controllers,
wherein the one or more controllers terminate the display indicating that the virus has been detected in a case where the file from which the virus has been cleaned as a result of the specific measure corresponds to the file as a target of the display indicating that the virus has been detected, and
the one or more controllers terminate the display indicating that the virus has been detected after an operation of confirming the display indicating that the virus has been detected in a case where the file from which the virus has been cleaned as a result of the specific measure does not correspond to the file as a target of the display indicating that the virus has been detected.

2. The information processing apparatus according to claim 1,
wherein the one or more controllers restrict the display indicating that the virus has been detected in the case where the file from which the virus has been cleaned as the result of the specific measure corresponds to the file as the target of the display indicating that the virus has been detected.

3. The information processing apparatus according to claim 1,
wherein the one or more controllers determine whether the file from which the virus has been cleaned as the result of the specific measure corresponds to the file as the target of the display indicating that the virus has been detected.

4. The information processing apparatus according to claim 3,
wherein the one or more controllers determine whether the file from which the virus has been cleaned as the result of the specific measure corresponds to the file as the target of the display indicating that the virus has been detected, by comparing a file path representing a storage position of the file on which the specific measure has been performed with a file path representing a storage position of the file as the target of the display indicating that the virus has been detected.

5. The information processing apparatus according to claim 1,
wherein the specific measure for the file is any of disconnection from an external storage device storing the file, deletion of the file, transfer of the file, and update of the file.

6. The information processing apparatus according to claim 5,
wherein the one or more controllers detect, in a case where the file is updated as the specific measure, the virus in the file after the updating.

7. The information processing apparatus according to claim 1,
wherein the one or more controllers delete the display indicating that the virus has been detected in the case where the file from which the virus has been cleaned as the result of the specific measure corresponds to the file as the target of the display indicating that the virus has been detected.

8. The information processing apparatus according to claim 1, wherein the one or more controllers display a factor related to cleaning of the virus in the display content indicating that the virus has been detected in the case where the file as the target of the display indicating that the virus has been detected corresponds to the file from which the virus has been cleaned as a result of the specific measure.

9. The information processing apparatus according to claim 8, comprising:

a notification device that provides, to a user, a notification that the display indicating that the virus has been detected is being continued.

10. The information processing apparatus according to claim 1, wherein the one or more controllers display a display indicating that the virus has been detected in which further displays including a factor regarding cleaning of the virus caused by the specific measure in a case where the file from which the virus has been cleaned as a result of the specific measure corresponds to the file as a target of the display indicating that the virus has been detected.

11. The information processing apparatus according to claim 10, wherein the factor regarding the cleaning is any one of deletion processing, isolation processing or updating processing.

12. The information processing apparatus according to claim 11, wherein the one or more controllers display that the file has already been deleted when the factor regarding cleaning is deletion processing.

13. The information processing apparatus according to claim 1, wherein the one or more controllers display a re-display button for receiving an instruction to re-display a terminated display after a display that the virus has been detected is terminated.

14. The information processing apparatus according to claim 1, wherein the one or more controllers determine whether or not a file in which a virus is cleaned corresponds to a target file for which a virus is detected in a case where it is impossible to access to a file for which the virus is cleaned as a result of the specific measure.

15. A virus detection display method comprising:

detecting a virus and performing a specific measure on a file infected with the virus;

displaying that the virus has been detected as display content;

controlling to terminate a display indicating that the virus has been detected in a case where the file as a target of the display indicating that the virus has been detected corresponds to the file from which the virus has been cleaned as a result of the specific measure, and controlling to terminate the display indicating that the virus has been detected after an operation of confirming the display indicating that the virus has been detected in a case where the file from which the virus has been cleaned as a result of the specific measure does not correspond to the file as a target of the display indicating that the virus has been detected.

\* \* \* \* \*